United States Patent
York et al.

(10) Patent No.: US 11,287,218 B2
(45) Date of Patent: *Mar. 29, 2022

(54) DIGITAL RETICLE AIMING METHOD

(71) Applicant: Sig Sauer, Inc., Newington, NH (US)

(72) Inventors: Andrew W. York, Portland, OR (US); Gregory Scott Smith, Sherwood, OR (US); Richard Bradley Brumfield, Wilsonville, OR (US); Joseph Fruechtel, Portland, OR (US)

(73) Assignee: SIG SAUER, INC., Newington, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/127,771

(22) Filed: Dec. 18, 2020

(65) Prior Publication Data

US 2021/0348884 A1    Nov. 11, 2021

Related U.S. Application Data

(62) Division of application No. 16/158,062, filed on Oct. 11, 2018, now Pat. No. 10,907,934.

(Continued)

(51) Int. Cl.
*F41G 1/38* (2006.01)
*F41G 1/473* (2006.01)
(Continued)

(52) U.S. Cl.
CPC .............. *F41G 1/473* (2013.01); *F41G 1/345* (2013.01); *F41G 1/38* (2013.01); *G01S 19/01* (2013.01);
(Continued)

(58) Field of Classification Search
CPC ........ G01S 19/01; G01S 17/08; G06F 3/0484; F41G 1/12; F41G 1/14; F41G 1/38;
(Continued)

(56) References Cited

U.S. PATENT DOCUMENTS

| | | | |
|---|---|---|---|
| 1,107,163 A * | 8/1914 | Grauheding | F41G 1/38 42/122 |
| 1,127,230 A | 2/1915 | Grauheding | |

(Continued)

FOREIGN PATENT DOCUMENTS

| | | |
|---|---|---|
| CA | 2589391 C | 2/2010 |
| CA | 2773537 A1 | 11/2011 |

(Continued)

OTHER PUBLICATIONS

International Search Report and Written Opinion of the International Searching Authority issued in International Application No. PCT/US2021/014015, dated Apr. 21, 2021, 11 pages.

*Primary Examiner* — Michael D David
(74) *Attorney, Agent, or Firm* — Miller Nash LLP

(57) ABSTRACT

A reticle for an aiming device includes a number of holdover indicators on the reticle that may be individually selected; an input for receiving ballistics data; and a processor configured to, based at least in part on the received ballistics data, select one or more of the holdover indicators; and cause the selected holdover indicator or indicators to visibly change state on the reticle. Methods of operating a digital reticle are also described. Further disclosed is a system that includes the reticle above, as well as a rangefinder for providing range data and a ballistics calculator for providing ballistics data.

18 Claims, 18 Drawing Sheets

Related U.S. Application Data

(60) Provisional application No. 62/571,173, filed on Oct. 11, 2017.

(51) Int. Cl.
*G06F 3/0484* (2022.01)
*F41G 1/34* (2006.01)
*G01S 19/01* (2010.01)
*F41G 3/06* (2006.01)
*G01S 17/08* (2006.01)

(52) U.S. Cl.
CPC .............. *G06F 3/0484* (2013.01); *F41G 3/06* (2013.01); *G01S 17/08* (2013.01)

(58) Field of Classification Search
CPC . F41G 1/345; F41G 1/473; F41G 3/06; F41G 3/08; G02B 23/14
USPC ...... 42/122; 89/41.17; 156/345.24; 235/404, 235/414
See application file for complete search history.

(56) References Cited

U.S. PATENT DOCUMENTS

| | | | |
|---|---|---|---|
| 1,190,121 A * | 7/1916 | Critchett ................ | F41G 1/38 42/119 |
| 1,708,389 A * | 4/1929 | Karnes ................... | F41G 3/00 89/41.22 |
| 1,724,093 A * | 8/1929 | Kauch et al. ........... | F41G 5/18 89/205 |
| 1,803,939 A * | 5/1931 | Karnes ................... | F41G 3/00 89/200 |
| 1,989,697 A * | 2/1935 | Knisley .................. | F41G 1/12 89/41.21 |
| 2,154,454 A * | 4/1939 | Joyce ..................... | F41G 1/12 42/122 |
| 2,162,723 A | 6/1939 | Karnes | |
| 2,171,571 A * | 9/1939 | Karnes ................... | G02B 27/34 42/123 |
| 2,250,179 A * | 7/1941 | Brown .................... | F41G 1/033 42/138 |
| 2,253,948 A * | 8/1941 | Brown .................... | F41G 1/04 42/136 |
| 2,355,920 A * | 8/1944 | Marston .................. | F41G 3/12 89/204 |
| 2,363,523 A * | 11/1944 | Greenblatt, Jr. et al. ................ F41G 5/18 89/205 | |
| 2,372,613 A * | 3/1945 | Svoboda ................. | F41G 5/08 356/29 |
| 2,404,302 A * | 7/1946 | Land ...................... | G01C 3/16 356/14 |
| 2,420,252 A * | 5/1947 | Land ...................... | G02B 27/32 359/428 |
| 2,433,843 A * | 1/1948 | Hammond, Jr. ........ | F41G 5/18 89/37.16 |
| 2,450,712 A * | 10/1948 | Brown .................... | G02B 27/32 356/247 |
| 2,455,963 A * | 12/1948 | Wheeler ................. | F41G 3/06 89/204 |
| 2,464,195 A * | 3/1949 | Burley ................... | F41G 1/345 356/29 |
| 2,504,168 A | 4/1950 | Rood | |
| 2,534,225 A * | 12/1950 | Brown .................... | F41G 5/00 89/202 |
| 2,538,253 A * | 1/1951 | Lakatos .................. | F41G 3/08 235/404 |
| 2,586,807 A | 2/1952 | Fowler | |
| 2,596,522 A * | 5/1952 | Bethke ................... | F41G 1/30 42/113 |
| 2,609,606 A * | 9/1952 | Bentley .................. | F41G 5/00 89/202 |
| 2,690,014 A | 9/1954 | Draper et al. | |
| 2,734,273 A * | 2/1956 | Blindenbacher et al. ................. G01C 3/22 356/21 |  |
| 2,737,652 A * | 3/1956 | White ..................... | F41G 9/002 342/97 |
| 2,806,287 A * | 9/1957 | Sullivan ................. | F41G 1/38 33/297 |
| 2,811,894 A * | 11/1957 | Braker .................... | F41G 1/38 356/21 |
| 2,878,466 A * | 3/1959 | Shank .................... | F41G 7/2246 342/78 |
| 2,949,816 A * | 8/1960 | Weaver .................. | G02B 23/14 356/247 |
| 2,963,788 A * | 12/1960 | Luboshez ............... | F41G 5/16 89/202 |
| 2,964,991 A * | 12/1960 | Coeytaux ................ | F41G 1/393 356/17 |
| 3,059,338 A * | 10/1962 | Coeytaux ................ | F41G 3/06 356/29 |
| 3,097,432 A * | 7/1963 | Shaw ...................... | F41G 1/12 33/297 |
| 3,121,134 A * | 2/1964 | Heinzel ................. | G02B 23/145 359/422 |
| 3,169,726 A * | 2/1965 | Jackson .................. | F41G 7/30 244/3.14 |
| 3,190,003 A * | 6/1965 | O'Brien .................. | F41G 1/12 33/297 |
| 3,199,197 A * | 8/1965 | Macleod ................ | G01B 11/02 33/277 |
| 3,286,352 A * | 11/1966 | Schray ................... | G02B 27/32 33/297 |
| 3,340,614 A * | 9/1967 | Leatherwood .......... | F41G 11/005 42/122 |
| 3,381,380 A * | 5/1968 | Thomas .................. | G02B 27/32 33/297 |
| 3,383,987 A * | 5/1968 | Macmillan ............. | F41G 3/22 89/41.21 |
| 3,392,450 A * | 7/1968 | Herter .................... | F41G 1/473 42/122 |
| 3,431,652 A * | 3/1969 | Leatherwood ........... | F41G 3/06 42/122 |
| 3,492,733 A * | 2/1970 | Leatherwood ......... | G02B 23/14 42/122 |
| 3,568,324 A | 3/1971 | Jorczak | |
| 3,682,552 A * | 8/1972 | Hartman ................ | G01C 3/04 356/3 |
| 3,744,133 A * | 7/1973 | Fukushima ............. | F41G 1/54 42/121 |
| 3,782,822 A * | 1/1974 | Spence .................. | G02B 23/145 356/21 |
| 3,948,587 A * | 4/1976 | Rubbert ................. | G01C 3/04 356/21 |
| 4,205,916 A * | 6/1980 | Vogl ...................... | F41G 11/00 33/297 |
| 4,263,719 A * | 4/1981 | Murdoch ................ | F41G 1/12 33/277 |
| 4,285,137 A * | 8/1981 | Jennie .................... | F41G 1/473 33/298 |
| 4,312,262 A * | 1/1982 | Tye ........................ | F41G 9/002 235/412 |
| 4,403,421 A * | 9/1983 | Shepherd ................ | F41G 1/38 42/122 |
| 4,497,548 A * | 2/1985 | Burris .................... | G02B 23/14 359/422 |
| 4,531,052 A * | 7/1985 | Moore .................... | F41G 3/06 235/404 |
| 4,561,204 A * | 12/1985 | Binion ................... | F41G 1/38 356/21 |
| 4,584,776 A * | 4/1986 | Shepherd ................ | G02B 23/10 33/298 |
| 4,618,221 A * | 10/1986 | Thomas ................. | G02B 27/36 359/428 |
| 4,671,165 A * | 6/1987 | Heidmann .............. | F41G 3/06 89/41.19 |

(56) References Cited

U.S. PATENT DOCUMENTS

| | | | | |
|---|---|---|---|---|
| 4,720,804 A * | 1/1988 | Moore | ................... | G02B 21/00 33/298 |
| 4,743,765 A * | 5/1988 | Ekstrand | ................ | G02B 27/34 250/467.1 |
| 4,777,352 A * | 10/1988 | Moore | ................... | F41G 3/06 235/404 |
| 4,777,861 A * | 10/1988 | Lecuyer | ................... | F41G 3/06 89/1.813 |
| 4,787,739 A * | 11/1988 | Gregory | ................... | G01C 3/22 356/21 |
| 4,806,007 A * | 2/1989 | Bindon | ................... | F41G 1/38 359/424 |
| 4,912,853 A * | 4/1990 | McDonnell | ............... | F41G 1/12 33/1 B |
| 4,945,646 A * | 8/1990 | Ekstrand | ................ | F41G 1/30 356/252 |
| 4,965,439 A * | 10/1990 | Moore | ................... | F41G 3/06 235/404 |
| 5,005,308 A | 4/1991 | Parks | | |
| 5,026,158 A * | 6/1991 | Golubic | ................... | F41G 1/38 356/252 |
| 5,068,969 A * | 12/1991 | Siebert | ................... | F41G 1/345 42/132 |
| 5,181,323 A * | 1/1993 | Cooper | ................... | F41G 1/38 359/422 |
| 5,355,224 A * | 10/1994 | Wallace | ................. | G02B 23/10 359/631 |
| 5,375,072 A * | 12/1994 | Cohen | ................... | F41G 3/06 235/414 |
| 5,413,029 A * | 5/1995 | Gent | ................... | F41G 3/12 235/408 |
| 5,456,157 A * | 10/1995 | Lougheed | ............... | F41A 17/08 348/143 |
| 5,491,546 A * | 2/1996 | Wascher | ................... | F41G 1/38 356/20 |
| RE35,409 E | 12/1996 | Moore | | |
| 5,783,825 A * | 7/1998 | Wiese | ................... | G01S 3/7864 250/252.1 |
| 5,822,713 A * | 10/1998 | Profeta | ................... | F41G 3/02 701/302 |
| 5,901,452 A * | 5/1999 | Clarkson | ................... | F41G 1/30 42/131 |
| 5,920,995 A * | 7/1999 | Sammut | ................... | F41G 1/033 42/122 |
| 5,973,315 A * | 10/1999 | Saldana | ................... | F41G 3/06 250/214 VT |
| 6,032,374 A | 3/2000 | Sammut | | |
| 6,111,692 A * | 8/2000 | Sauter | ................... | G02B 23/12 359/399 |
| 6,247,259 B1 * | 6/2001 | Tsadka | ................... | F41G 3/06 42/114 |
| 6,269,581 B1 * | 8/2001 | Groh | ................... | F41G 1/38 42/122 |
| 6,357,158 B1 * | 3/2002 | Smith, III | ................... | F41G 1/38 42/122 |
| 6,453,595 B1 * | 9/2002 | Sammut | ................... | F41G 1/38 42/122 |
| 6,516,551 B2 * | 2/2003 | Gaber | ................... | F41G 1/345 42/132 |
| 6,516,699 B2 * | 2/2003 | Sammut | ................... | F41G 1/38 42/122 |
| 6,591,537 B2 | 7/2003 | Smith | | |
| 6,681,512 B2 | 1/2004 | Sammut | | |
| 6,729,062 B2 * | 5/2004 | Thomas | ................... | F41G 1/38 42/122 |
| 6,802,131 B1 * | 10/2004 | Scholz | ................... | G01C 15/06 33/265 |
| 6,886,287 B1 * | 5/2005 | Bell | ................... | F41G 1/54 33/334 |
| 6,978,569 B2 | 12/2005 | Williamson, IV et al. | | |
| 7,069,684 B2 | 7/2006 | Smith | | |
| 7,171,775 B1 * | 2/2007 | Lacorte | ................... | F41G 1/38 42/122 |
| 7,171,776 B2 * | 2/2007 | Staley, III | ................ | F41G 1/35 42/111 |
| 7,185,455 B2 * | 3/2007 | Zaderey | ................... | F41G 1/38 42/122 |
| 7,194,838 B2 | 3/2007 | Smith | | |
| D542,879 S | 5/2007 | Zaderey | | |
| 7,222,452 B2 | 5/2007 | Smith | | |
| 7,225,578 B2 * | 6/2007 | Tai | ............ | F41G 1/30 33/334 |
| 7,237,355 B2 | 7/2007 | Smith | | |
| 7,269,920 B2 * | 9/2007 | Staley, III | ................ | F41G 1/38 42/111 |
| 7,292,262 B2 * | 11/2007 | Towery | ................... | F41G 1/54 348/61 |
| 7,296,358 B1 * | 11/2007 | Murphy | ................... | F41G 1/44 33/265 |
| 7,325,353 B2 * | 2/2008 | Cole | ................... | F41G 1/38 42/119 |
| 7,325,354 B2 * | 2/2008 | Grauslys | ................... | F41G 1/30 42/123 |
| 7,328,531 B2 * | 2/2008 | Dietz | ................... | F41G 1/473 42/133 |
| 7,343,707 B2 | 3/2008 | Smith | | |
| 7,350,329 B1 | 4/2008 | Bell et al. | | |
| 7,386,953 B2 * | 6/2008 | Ball | ................... | F41G 1/01 42/113 |
| 7,421,816 B2 * | 9/2008 | Conescu | ................... | F41G 1/473 42/114 |
| 7,490,430 B2 * | 2/2009 | Staley, III | ................ | F41G 1/48 42/105 |
| 7,516,571 B2 * | 4/2009 | Scrogin | ................... | F41G 1/38 42/114 |
| 7,530,192 B2 | 5/2009 | Grauslys et al. | | |
| 7,584,570 B2 | 9/2009 | Smith | | |
| 7,603,804 B2 | 10/2009 | Zaderey et al. | | |
| 7,624,528 B1 * | 12/2009 | Bell | ................... | F41G 1/38 42/115 |
| 7,654,029 B2 | 2/2010 | Peters et al. | | |
| 7,658,031 B2 | 2/2010 | Cross et al. | | |
| 7,690,145 B2 | 4/2010 | Peters et al. | | |
| 7,703,679 B1 * | 4/2010 | Bennetts | ................... | F41G 3/06 235/454 |
| 7,703,719 B1 | 4/2010 | Bell et al. | | |
| 7,705,975 B1 * | 4/2010 | Farris | ................... | G02B 27/32 356/124 |
| 7,738,082 B1 * | 6/2010 | Peters | ................... | F41G 3/02 356/4.01 |
| 7,748,155 B2 | 7/2010 | Cole | | |
| 7,752,798 B2 | 7/2010 | Mayerle | | |
| 7,764,434 B2 * | 7/2010 | Hakansson | ............ | G02B 23/10 359/638 |
| 7,793,456 B1 * | 9/2010 | Lacorte | ................... | F41G 1/38 42/122 |
| 7,806,331 B2 * | 10/2010 | Windauer | ................... | F41G 1/38 235/404 |
| 7,832,137 B2 * | 11/2010 | Sammut | ................... | F41G 3/06 42/111 |
| 7,836,626 B2 * | 11/2010 | Shepherd | ................... | F41G 1/44 42/130 |
| 7,856,750 B2 | 12/2010 | Sammut et al. | | |
| 7,877,886 B1 * | 2/2011 | Hamilton | ................... | F41G 1/12 33/297 |
| 7,905,046 B2 * | 3/2011 | Smith, III | ................ | F41G 3/06 42/142 |
| 7,937,878 B2 * | 5/2011 | Sammut | ................... | F41G 1/38 42/122 |
| 8,001,714 B2 * | 8/2011 | Davidson | ................ | G05B 15/02 42/122 |
| 8,006,429 B2 | 8/2011 | Windauer | | |
| 8,033,464 B2 | 10/2011 | Windauer et al. | | |
| 8,046,951 B2 | 11/2011 | Peters et al. | | |
| 8,051,597 B1 * | 11/2011 | D'Souza | ................... | G01S 17/95 42/119 |
| 8,056,281 B2 | 11/2011 | Staley | | |

(56) References Cited

U.S. PATENT DOCUMENTS

| | | | |
|---|---|---|---|
| 8,074,394 B2 * | 12/2011 | Lowrey, III | F41G 3/08 42/123 |
| 8,081,298 B1 * | 12/2011 | Cross | F41G 3/06 356/4.01 |
| 8,091,268 B2 | 1/2012 | York | |
| 8,109,029 B1 | 2/2012 | Sammut et al. | |
| 8,172,139 B1 * | 5/2012 | McDonald | G01C 3/04 235/404 |
| 8,196,828 B2 * | 6/2012 | Kelly | F41G 3/14 235/404 |
| 8,201,741 B2 * | 6/2012 | Bennetts | F41G 1/12 235/454 |
| 8,230,635 B2 | 7/2012 | Sammut et al. | |
| 8,281,995 B2 * | 10/2012 | Bay | F41G 11/00 235/414 |
| 8,282,493 B2 * | 10/2012 | Roman | F41G 1/467 463/51 |
| 8,286,384 B2 | 10/2012 | Zaderey et al. | |
| 8,314,923 B2 | 11/2012 | York et al. | |
| 8,317,100 B2 | 11/2012 | Windauer et al. | |
| 8,336,776 B2 * | 12/2012 | Horvath | F41G 3/06 235/407 |
| 8,353,454 B2 * | 1/2013 | Sammut | F41G 1/473 235/404 |
| 8,365,455 B2 | 2/2013 | Davidson | |
| 8,375,620 B2 * | 2/2013 | Staley, III | F41G 1/52 42/142 |
| 8,408,460 B2 * | 4/2013 | Schneider | F41G 1/473 235/412 |
| 8,414,298 B2 * | 4/2013 | D'Souza | F41G 1/46 434/19 |
| 8,448,372 B2 | 5/2013 | Peters et al. | |
| 8,453,368 B2 * | 6/2013 | Bockmon | F41G 3/06 42/111 |
| 8,468,930 B1 * | 6/2013 | Bell | F41G 1/38 89/204 |
| 8,500,563 B2 | 8/2013 | Román et al. | |
| 8,516,736 B2 | 8/2013 | Windauer | |
| 8,584,944 B2 * | 11/2013 | White | G06G 1/0057 235/406 |
| 8,608,069 B1 | 12/2013 | Bay | |
| 8,656,630 B2 | 2/2014 | Sammut | |
| 8,701,330 B2 * | 4/2014 | Tubb | F41G 1/38 42/122 |
| 8,705,173 B2 * | 4/2014 | Peters | F41G 3/06 359/428 |
| 8,707,608 B2 | 4/2014 | Sammut et al. | |
| D709,588 S | 7/2014 | Silvers et al. | |
| 8,807,430 B2 * | 8/2014 | Millett | F41G 3/06 235/407 |
| 8,833,655 B2 * | 9/2014 | McCarty | G01B 11/14 235/404 |
| 8,881,981 B2 * | 11/2014 | Millett | F41G 1/473 235/404 |
| 8,893,423 B2 * | 11/2014 | Tubb | F41G 1/38 42/122 |
| 8,893,971 B1 | 11/2014 | Sammut et al. | |
| 8,905,307 B2 | 12/2014 | Sammut et al. | |
| 8,910,412 B2 | 12/2014 | Mikroulis | |
| 8,919,647 B2 | 12/2014 | Chen et al. | |
| 8,959,823 B2 | 2/2015 | Peters et al. | |
| 8,959,824 B2 | 2/2015 | Sammut et al. | |
| 8,966,806 B2 | 3/2015 | Sammut et al. | |
| 8,991,702 B1 | 3/2015 | Sammut et al. | |
| 9,004,358 B2 | 4/2015 | Bay | |
| 9,033,232 B2 | 5/2015 | Bockmon | |
| 9,038,307 B2 | 5/2015 | Silvers et al. | |
| 9,038,901 B2 | 5/2015 | Paterson et al. | |
| 9,057,587 B2 | 6/2015 | Roman et al. | |
| 9,068,794 B1 | 6/2015 | Sammut | |
| 9,068,795 B2 | 6/2015 | Roman et al. | |
| 9,074,845 B2 | 7/2015 | Wiklund | |
| 9,091,507 B2 | 7/2015 | Paterson et al. | |
| 9,110,295 B2 | 8/2015 | Lupher et al. | |
| 9,115,956 B2 | 8/2015 | Hakanson et al. | |
| 9,115,958 B2 | 8/2015 | Crispin | |
| 9,121,672 B2 | 9/2015 | Tubb | |
| 9,127,907 B2 | 9/2015 | Lupher et al. | |
| 9,127,909 B2 | 9/2015 | Ehrlich | |
| 9,127,910 B2 | 9/2015 | Volfson | |
| 9,127,911 B2 | 9/2015 | Varshneya et al. | |
| 9,140,521 B2 | 9/2015 | Millett | |
| 9,151,574 B2 | 10/2015 | Lowrey | |
| 9,157,701 B2 | 10/2015 | Varshneya et al. | |
| 9,175,927 B2 | 11/2015 | Tubb | |
| 9,194,880 B2 | 11/2015 | Kremer | |
| 9,212,868 B2 | 12/2015 | Roman et al. | |
| 9,239,213 B2 | 1/2016 | Chen et al. | |
| 9,250,035 B2 | 2/2016 | Sullivan et al. | |
| 9,250,036 B2 | 2/2016 | Farca et al. | |
| 9,250,038 B2 | 2/2016 | Sammut et al. | |
| 9,255,771 B2 | 2/2016 | Sammut et al. | |
| 9,285,187 B2 | 3/2016 | Stockdill | |
| 9,292,034 B2 | 3/2016 | Windauer | |
| D753,785 S | 4/2016 | Silvers et al. | |
| 9,310,163 B2 | 4/2016 | Bay | |
| 9,310,165 B2 | 4/2016 | Bell et al. | |
| 9,335,120 B2 | 5/2016 | Roman et al. | |
| 9,335,123 B2 | 5/2016 | Sammut | |
| 9,347,742 B2 | 5/2016 | Varshneya et al. | |
| 9,395,155 B1 | 7/2016 | Bockmon | |
| 9,429,653 B2 | 8/2016 | Volfson | |
| 9,429,745 B2 | 8/2016 | Brumfield | |
| 9,435,610 B2 | 9/2016 | Silvers et al. | |
| 9,459,077 B2 | 10/2016 | Sammut et al. | |
| 9,464,871 B2 | 10/2016 | Bay | |
| 9,466,120 B2 | 10/2016 | Maryfield et al. | |
| 9,482,488 B2 | 11/2016 | Moyle | |
| 9,482,489 B2 | 11/2016 | Peters et al. | |
| 9,482,516 B2 | 11/2016 | McCarthy et al. | |
| 9,500,444 B2 | 11/2016 | Sammut et al. | |
| 9,518,804 B2 | 12/2016 | Hamilton | |
| 9,557,142 B2 | 1/2017 | Tubb | |
| 9,568,277 B2 | 2/2017 | Crispin | |
| 9,568,279 B2 | 2/2017 | Maryfield et al. | |
| 9,574,849 B2 | 2/2017 | Hakanson et al. | |
| 9,574,850 B2 | 2/2017 | Sammut et al. | |
| 9,581,415 B2 | 2/2017 | Tubb | |
| 9,593,907 B2 | 3/2017 | Regan et al. | |
| 9,612,086 B2 | 4/2017 | Sammut et al. | |
| 9,651,338 B2 | 5/2017 | Theisinger | |
| 9,665,120 B2 | 5/2017 | Windauer | |
| 9,677,848 B2 | 6/2017 | Hamilton | |
| 9,677,851 B2 | 6/2017 | Hancosky | |
| 9,678,099 B2 | 6/2017 | Maryfield et al. | |
| 9,678,208 B2 | 6/2017 | Volfson | |
| 9,689,643 B2 | 6/2017 | Farca et al. | |
| 9,777,992 B2 | 10/2017 | McRee | |
| 9,874,421 B2 | 1/2018 | Stockdill | |
| 10,145,652 B2 | 12/2018 | Paterson et al. | |
| 10,288,380 B1 | 5/2019 | York | |
| 2004/0148841 A1 | 8/2004 | Burzel | |
| 2005/0241207 A1 * | 11/2005 | Staley, III | F41G 3/065 42/105 |
| 2005/0257414 A1 * | 11/2005 | Zaderey | F41G 1/38 42/122 |
| 2007/0056203 A1 | 3/2007 | Gering et al. | |
| 2007/0097351 A1 * | 5/2007 | York | F41G 3/06 356/5.02 |
| 2007/0137088 A1 * | 6/2007 | Peters | F41G 3/02 42/111 |
| 2007/0144052 A1 | 6/2007 | Smith | |
| 2007/0197314 A1 | 8/2007 | York et al. | |
| 2008/0098640 A1 * | 5/2008 | Sammut | F41G 1/38 42/122 |
| 2009/0183417 A1 | 7/2009 | Smith | |
| 2009/0199451 A1 * | 8/2009 | Zaderey | F41G 1/38 42/122 |
| 2009/0199453 A1 * | 8/2009 | Cross | G01C 3/08 42/142 |

(56) References Cited

U.S. PATENT DOCUMENTS

| | | | |
|---|---|---|---|
| 2011/0021293 A1* | 1/2011 | York | A63B 71/06 473/407 |
| 2011/0271577 A1 | 11/2011 | Davidson | |
| 2011/0296733 A1* | 12/2011 | York | F41G 1/38 42/131 |
| 2012/0132709 A1* | 5/2012 | Lowrey, III | F41C 27/22 235/407 |
| 2012/0145785 A1 | 6/2012 | Scrogin et al. | |
| 2012/0217300 A1 | 8/2012 | McDonald et al. | |
| 2013/0014421 A1 | 1/2013 | Sammut et al. | |
| 2014/0000146 A1 | 1/2014 | Davidson | |
| 2014/0041277 A1* | 2/2014 | Hamilton | F41G 1/36 42/122 |
| 2014/0063261 A1* | 3/2014 | Betensky | G02B 23/145 348/158 |
| 2014/0101982 A1 | 4/2014 | McPhee | |
| 2014/0123534 A1* | 5/2014 | Hodnett | F41G 1/38 42/122 |
| 2014/0166750 A1* | 6/2014 | Chen | F41G 1/40 235/404 |
| 2014/0166751 A1* | 6/2014 | Sammut | F41G 3/00 235/404 |
| 2014/0184476 A1 | 7/2014 | McHale et al. | |
| 2014/0231014 A1 | 8/2014 | Davidson | |
| 2014/0339307 A1 | 11/2014 | Sammut et al. | |
| 2014/0373424 A1 | 12/2014 | Silvers et al. | |
| 2015/0106046 A1 | 4/2015 | Chen et al. | |
| 2015/0153139 A1 | 6/2015 | Davidson | |
| 2015/0198410 A1 | 7/2015 | McRee | |
| 2015/0276346 A1* | 10/2015 | Hamilton | G02B 27/32 42/123 |
| 2015/0323780 A1* | 11/2015 | Hamilton | G02B 23/14 359/428 |
| 2016/0010949 A1 | 1/2016 | Teetzel et al. | |
| 2016/0010950 A1 | 1/2016 | Sammut et al. | |
| 2016/0025455 A1 | 1/2016 | Paterson et al. | |
| 2016/0069640 A1 | 3/2016 | Pretorius | |
| 2016/0091282 A1* | 3/2016 | Baker | F41G 3/02 348/158 |
| 2016/0109210 A1 | 4/2016 | Lupher et al. | |
| 2016/0138890 A1* | 5/2016 | Hofmann | G02B 27/36 345/59 |
| 2016/0163080 A1 | 6/2016 | Baker | F41G 3/08 345/632 |
| 2016/0169625 A1* | 6/2016 | Richards | F41G 3/165 348/333.02 |
| 2016/0202021 A1* | 7/2016 | Roman | F41G 3/165 345/633 |
| 2016/0202960 A1* | 7/2016 | Minh Le | G06F 8/40 717/158 |
| 2016/0223293 A1 | 8/2016 | Maryfield et al. | |
| 2016/0252325 A1* | 9/2016 | Sammut | F41G 1/473 42/122 |
| 2016/0265880 A1* | 9/2016 | Maryfield | F41G 3/08 |
| 2016/0327367 A1* | 11/2016 | Porter | F41G 1/54 |
| 2016/0370147 A1 | 12/2016 | Hancosky | |
| 2016/0377379 A1 | 12/2016 | Roman et al. | |
| 2016/0377380 A1 | 12/2016 | Sammut | |
| 2017/0082400 A1 | 3/2017 | York et al. | |
| 2017/0108376 A1 | 4/2017 | Maryfield et al. | |
| 2017/0138698 A1 | 5/2017 | York et al. | |
| 2017/0343317 A1* | 11/2017 | VanBecelaere | F41G 1/38 |
| 2019/0072364 A1* | 3/2019 | VanBecelaere | F41G 1/345 |
| 2019/0128643 A1* | 5/2019 | York | G06F 3/0484 |
| 2019/0219813 A1 | 7/2019 | Summerfield et al. | |

FOREIGN PATENT DOCUMENTS

| | | |
|---|---|---|
| CA | 2784280 A1 | 11/2011 |
| CA | 2743103 C | 10/2013 |
| CA | 2904485 A1 | 8/2014 |
| CA | 2847309 A1 | 9/2014 |
| CA | 2767420 C | 12/2014 |
| CA | 2660897 C | 6/2015 |
| CA | 2858582 C | 6/2015 |
| DE | 726699 C | 10/1942 |
| DE | 2000614 A1 | 7/1971 |
| DE | 2736598 A1 | 2/1978 |
| DE | 2652120 A1 | 5/1978 |
| DE | 3219940 A1 | 12/1983 |
| DE | 3622901 A1 | 1/1988 |
| DE | 19846655 A1 | 4/1999 |
| DE | 102004034267 A1 | 2/2006 |
| DE | 202005017276 U1 | 3/2006 |
| DE | 112007000314 T5 | 1/2009 |
| DE | 102008053948 A1 | 5/2009 |
| DE | 102013217240 A1 | 3/2014 |
| DE | 102013012257 A1 | 1/2015 |
| EP | 0359950 B1 | 5/1994 |
| EP | 0605290 B1 | 1/1997 |
| EP | 0844457 A2 | 5/1998 |
| EP | 1007995 A1 | 6/2000 |
| EP | 1057201 A1 | 12/2000 |
| EP | 1436568 A2 | 7/2004 |
| EP | 1443354 A1 | 8/2004 |
| EP | 1690060 A2 | 8/2006 |
| EP | 1725890 A1 | 11/2006 |
| EP | 1748273 A1 | 1/2007 |
| EP | 1801614 A2 | 6/2007 |
| EP | 1804017 A1 | 7/2007 |
| EP | 1943681 A2 | 7/2008 |
| EP | 1969302 A2 | 9/2008 |
| EP | 1723382 B1 | 11/2008 |
| EP | 2008049 A2 | 12/2008 |
| EP | 1723383 B1 | 9/2009 |
| EP | 2148165 A2 | 1/2010 |
| EP | 2276050 A2 | 1/2011 |
| EP | 2276050 A3 | 1/2011 |
| EP | 2339286 A2 | 6/2011 |
| EP | 2402704 A1 | 1/2012 |
| EP | 1516151 B1 | 6/2012 |
| EP | 2475950 A2 | 7/2012 |
| EP | 1817538 B1 | 3/2013 |
| EP | 2659218 A2 | 11/2013 |
| EP | 2513591 B1 | 2/2014 |
| EP | 2694908 A2 | 2/2014 |
| EP | 2739933 A2 | 6/2014 |
| EP | 1646837 B1 | 8/2014 |
| EP | 2778739 A1 | 9/2014 |
| EP | 2781875 A2 | 9/2014 |
| EP | 2802837 A1 | 11/2014 |
| EP | 2452151 B1 | 3/2015 |
| EP | 2943735 A2 | 11/2015 |
| EP | 2956733 A1 | 12/2015 |
| EP | 2676098 B1 | 2/2016 |
| EP | 1038149 B1 | 4/2016 |
| EP | 3036504 A1 | 6/2016 |
| EP | 3084338 A1 | 10/2016 |
| EP | 3102905 A2 | 12/2016 |
| EP | 2811252 B1 | 1/2017 |
| EP | 3111155 A2 | 1/2017 |
| EP | 2536995 B1 | 10/2017 |
| FR | 1388007 A | 2/1965 |
| FR | 2699658 A1 | 6/1994 |
| FR | 2700840 B1 | 4/1996 |
| GB | 2094950 A | 9/1982 |
| GB | 2420867 B | 2/2008 |
| JP | S5536823 A | 3/1980 |
| TW | I485630 B | 5/2015 |
| WO | 2006060007 A1 | 6/2006 |
| WO | 2015095614 A1 | 6/2015 |
| WO | 2015156899 A2 | 10/2015 |
| WO | 2016018478 A2 | 2/2016 |
| WO | 2016018478 A3 | 3/2016 |
| WO | 2016145122 A1 | 9/2016 |
| WO | 2016145123 A1 | 9/2016 |
| WO | 2016145124 A2 | 9/2016 |
| WO | 2016145124 A3 | 11/2016 |
| WO | 2017205867 A1 | 11/2017 |

\* cited by examiner

DIGITAL RETICLE AIMING METHOD

CROSS REFERENCE TO RELATED APPLICATIONS

This application is a divisional of U.S. non-provisional patent application Ser. No. 16/158,062, titled BALLISTIC AIMING SYSTEM WITH DIGITAL RETICLE, filed Oct. 11, 2018, which is a non-provisional of and claims benefit from U.S. Provisional Application No. 62/571,173, filed Oct. 11, 2017, titled "BALLISTIC AIMING SYSTEM WITH DIGITAL RETICLE," the disclosures of both of which are incorporated herein by reference in their entirety.

BACKGROUND OF THE INVENTION

Riflescopes are mounted to rifles to assist a shooter, or user, in aiming the rifle to hit a desired target. Riflescopes may include reticles, which are markings or other indicators that appear in the field of view over the image of target through the riflescope. Reticles may include horizontal and vertical crosshairs with a central intersection point that can be calibrated to coincide with the point of impact of a projectile from the rifle. This central aiming point of the reticle may be zeroed-in at a particular zero range distance and then adjusted for different ranges and conditions using elevation and windage turrets to make slight adjustments to its vertical and horizontal position relative to the rifle. In this way, the user may always use the central intersection point of the crosshairs to aim the riflescope, and thus, the rifle. However, making mechanical adjustments to these elevation and windage turrets takes time, which may be disadvantageous in the field where a desired target could move at any time. Additionally, there are detailed reference charts the user must reference or memorize to correctly adjust these elevation and windage turrets.

As an alternative to the fine mechanical adjustments of elevation and windage turrets, some reticles are printed or formed with set holdover points, to use as aiming points instead of the central point. These holdover points save the user time in not having to make mechanical adjustments to dials, but still include complex charts to consult or memorize, which can cost the user time in the field and may result in mistake.

Embodiments of the invention address these and other limitations of the prior art.

DETAILED DESCRIPTION

Systems

Figure 1:
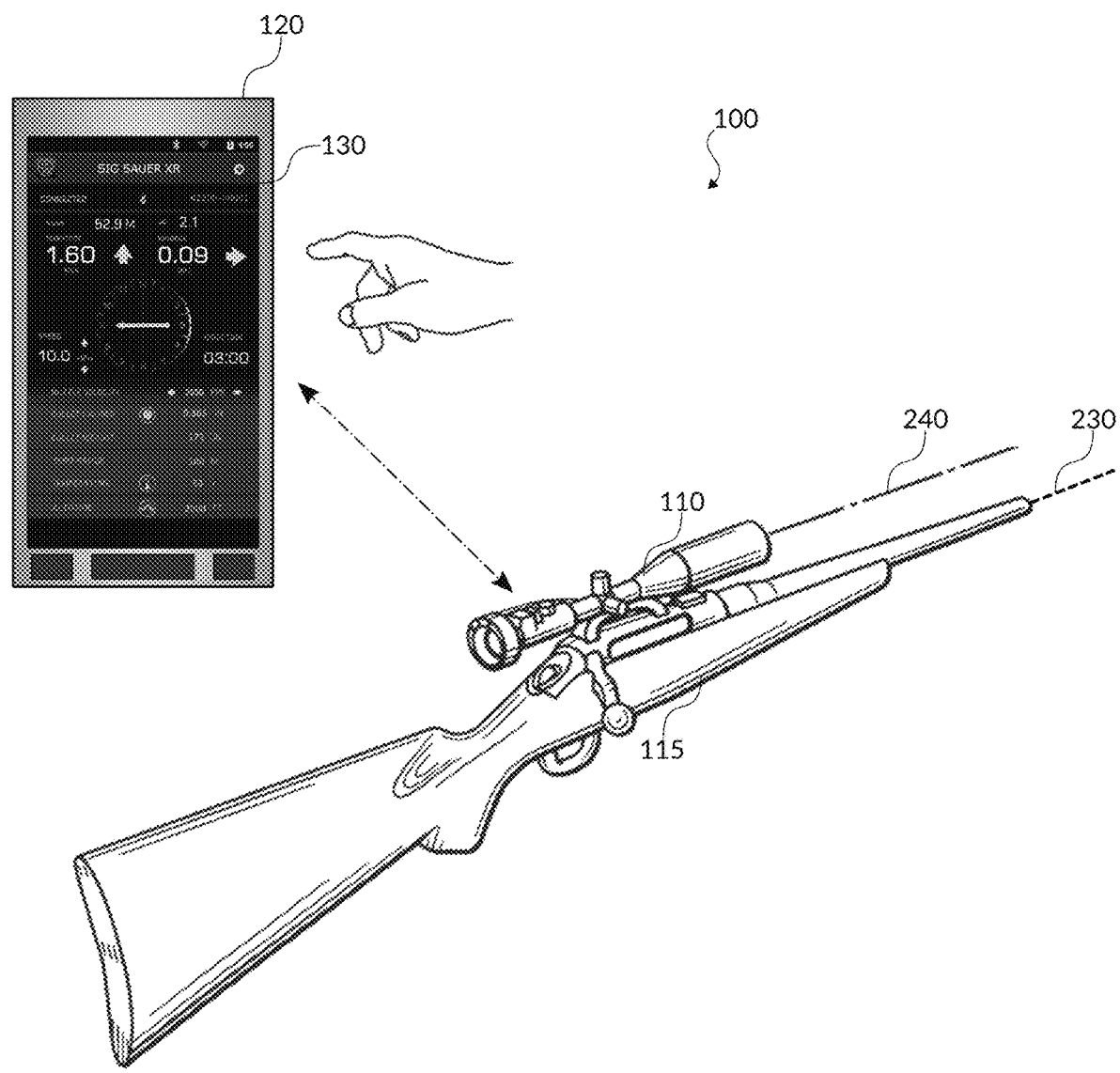
FIG. 1 shows a ballistic aiming system, including a digital reticle riflescope mounted to a rifle and a device running a ballistics solution application according to embodiments of the invention.

As shown in FIG. 1, a ballistic aiming system 100 may include a digital reticle riflescope 110 mounted to a rifle or other firearm 115 and a computational device 120 running a ballistics solution computer application, or app 130. The computational device 120 may be any computing device capable of running a ballistics solution application, such as a mobile phone, tablet computer, or a specialized ballistics computer, for example. The digital reticle riflescope 110 may be paired to the device 120 running the ballistics solution application 130 over a wireless communications means, such as Bluetooth or WiFi, for example. In other embodiments the riflescope 110 may communicate to the device 120 through a wired connection. The user may input information into the ballistics solution application 130 and/or select configuration settings for the digital reticle riflescope 110. The ballistics solution application 130 may use the input information to send a ballistics solution to the digital reticle riflescope 110. Once a ballistics solution is sent to the digital reticle riflescope 110, the user may view and use the ballistics solution on the digital reticle riflescope 110 without the device 120 running the ballistics solution application 130. Ballistics information used in a ballistics calculation may include information about a cartridge, projectile, caliber, bullet weight or mass, muzzle velocity, muzzle energy, ballistic coefficient, scope height, and/or drag coefficient, for example. Other ballistics information may include zero range, target ranges, preferred drag curves or models (common examples include G1, G2, G5, G6, G7, G8, or GL), and/or twist rate.

Figure 2:
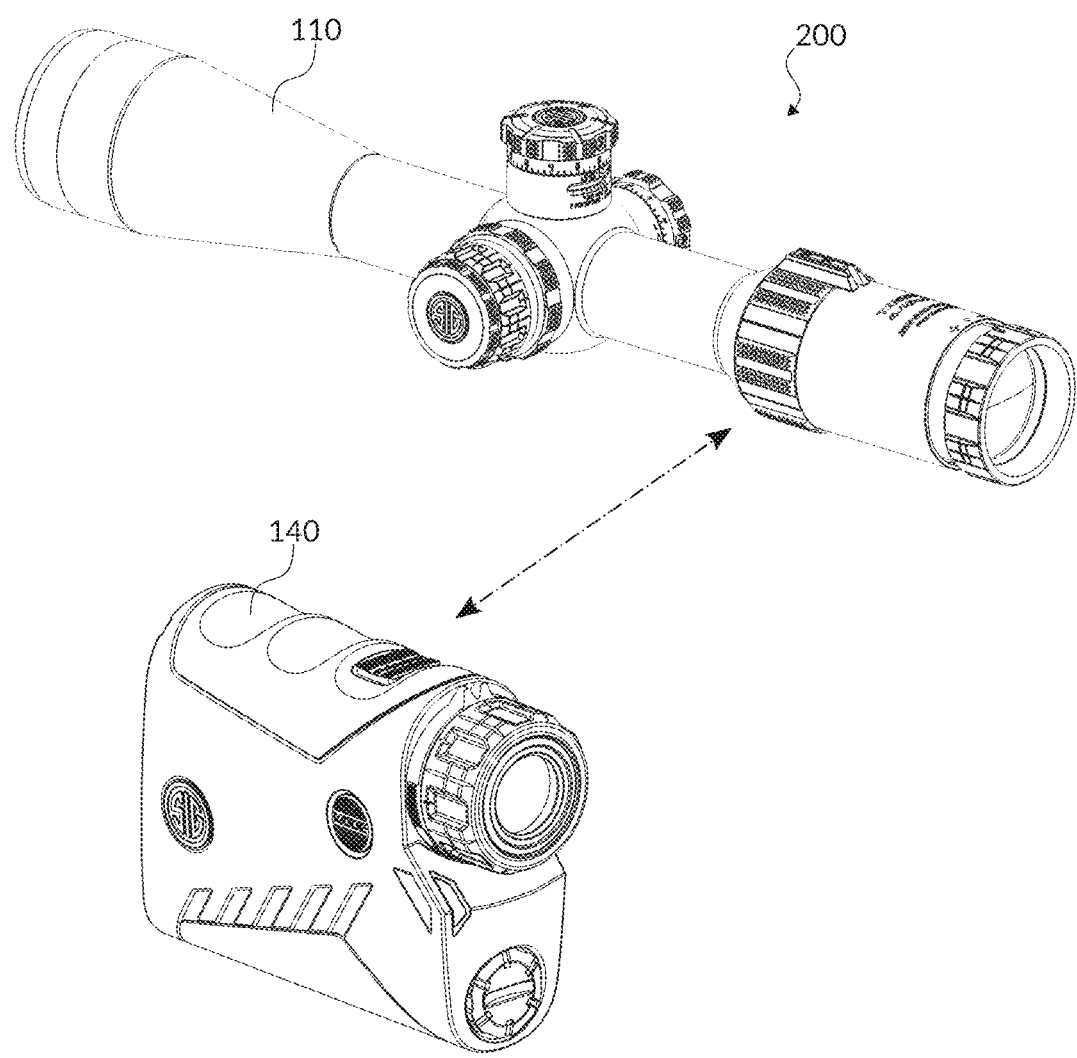
FIG. 2 shows a ballistic aiming system, including a digital reticle riflescope and a rangefinder with a built-in ballistics solution calculator application according to embodiments of the invention.

As illustrated in FIG. 2, additionally or alternatively, the ballistic aiming system 200 may include a digital reticle riflescope 110 mounted to a rifle 115 (not shown) and a rangefinder 140 with a built-in ballistics solution calculator. The rangefinder 140 may be paired or otherwise in communication with the digital reticle riflescope 110 and may send ballistics solutions to the digital reticle riflescope 110 based on the determined range to target. The digital reticle riflescope 110 may include a receiver or input 114 to receive the data. The rangefinder 140 may have been paired to the digital reticle riflescope 110 using a separate device 120 running a ballistics solution application 130, as shown in FIG. 1, where the various configuration settings were initially setup. Because the rangefinder 140 may have a built-in ballistics solution calculator, it is not necessary for the user to also have the device 120 running the ballistics solution application 130 for the system 200 to function. Rather, once paired, the rangefinder 140 may communicate directly with the digital reticle riflescope 110. The digital reticle riflescope 110 may also include a processor 112, which is used to select particular holdover indicators based at least in part on the received ballistics information, as described in detail below. In some embodiments the processor 112 may be embodied by a microcontroller, Application Specific Integrated Circuit (ASIC), firmware such as an FPGA, other hardware, or software or other machine codes operating on a general or special purpose processor, controller, or microcontroller.

Figure 3:
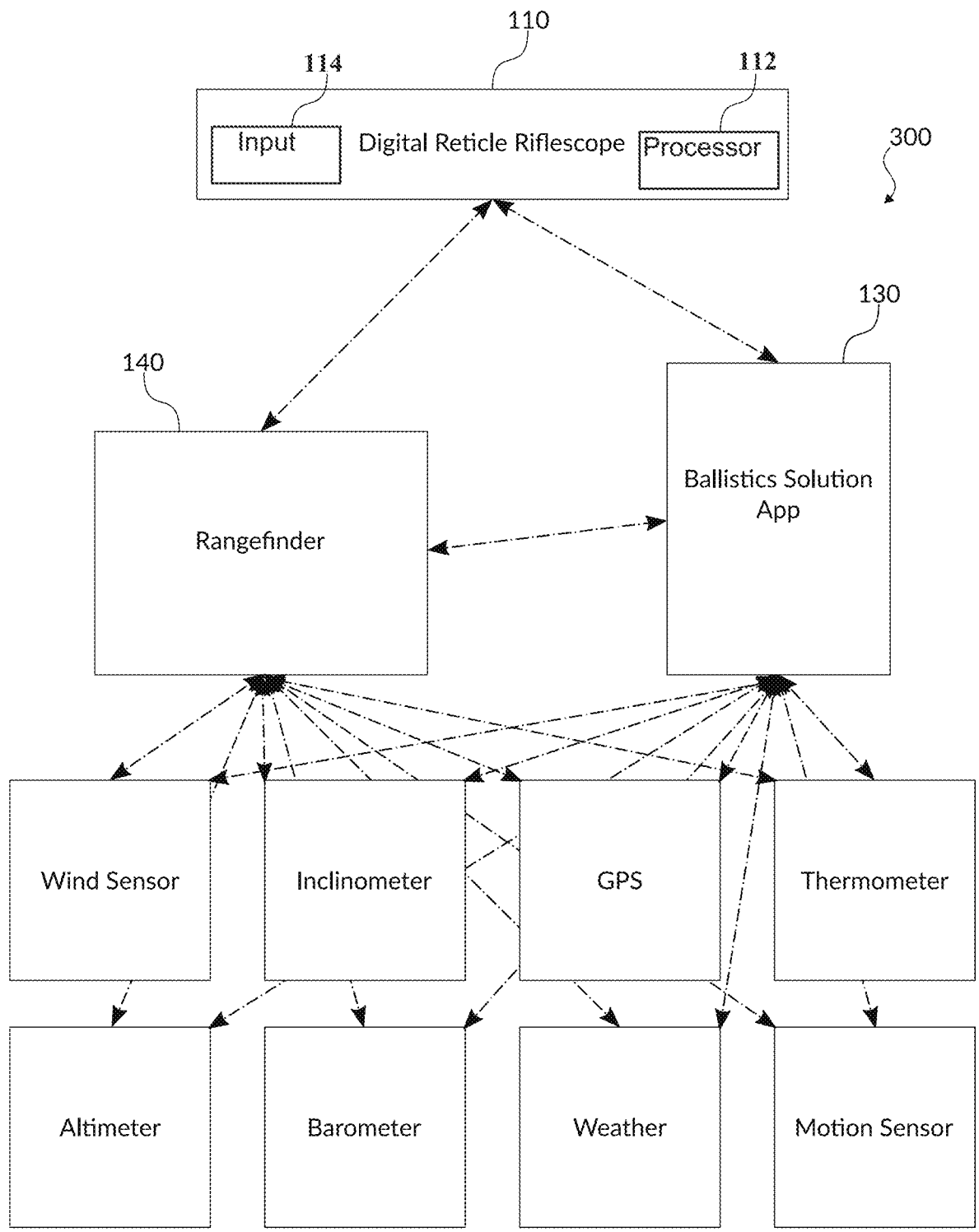
FIG. 3 is an example block diagram of a ballistic aiming system, including a digital reticle riflescope mounted to a rifle, a rangefinder with a built-in ballistics solution calculator, a device running a ballistics solution app, and peripheral sensors according to embodiments of the invention.

Additionally or alternatively, the ballistic aiming system 300 may include all of the digital reticle riflescope 110, the rangefinder 140, the device 120 running the ballistics solution application 130, and peripheral sensors that provide additional input information used in calculating the ballistics solution, as shown in FIG. 3. In this way, the user may have an entire network of devices in communication with each other that automatically gather data about the surrounding environment and use these conditions to calculate the most accurate ballistics solution for the user. In operation, output from any of the sensors illustrated connected to the ballistics solution application 130 or the rangefinder 140 may be used as one or more inputs to the ballistics calculation that determines the eventual ballistics solution.

Zeroing-In

Figure 4A:
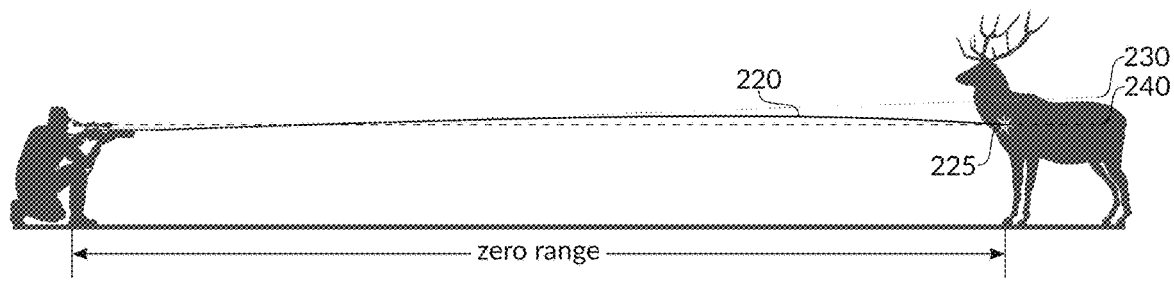
FIG. 4A shows an example ballistic trajectory.

As shown in FIG. 4A zeroing-in a riflescope to a shooting device includes shooting at a target from a known range (e.g., 100 yards) and adjusting the position of the reticle and/or riflescope 110 relative to a rifle bore line 230 until the central aiming point of the reticle within the riflescope 110, along an optical axis 240, appears to the user to coincide with an actual point of impact 225 on the target. These adjustments may be made in both the horizontal and vertical directions, using the windage and elevation adjustment knobs, respectively. When properly zeroed-in, the parabolic or curved ballistic trajectory 220 of the projectile from the particular rifle 115 at the baseline environmental conditions during the zeroing-in process intersects the optical line of sight 240 of the riflescope 110 at the known zero range.

Through the zeroing-in process, the riflescope 110, and thus, the optical axis 240, becomes locked into a set position relative to the rifle bore line 230. This set position between the riflescope line of sight 240 and the rifle bore line 230 may be exploited by using holdover points or aiming adjustment points displayed on the reticle or in the field of view of the riflescope 110 to cause the user to make adjustments θ to the angle and position of the rifle bore line 230, which results in corresponding changes to the initial line of fire 220 of the selected projectile.

The zero range may be one of the pieces of ballistic data entered into the device 120 running the ballistics solution application 130.

Ballistics

The ballistic trajectory 220 for the selected projectile will vary with environmental conditions, such as crosswind, pressure, temperature, density altitude, humidity, angle of incline, etc. Additionally, the ballistic trajectory 220 of a projectile from the rifle 115 will vary with the projectile characteristics, such as caliber, bullet weight, ballistic coefficient, muzzle velocity, etc. and/or with the barrel length and twist rate.

As shown in FIG. 4A, the ballistic trajectory 220 is a curve that begins its initial ascent at the angle of the rifle bore line 230. Due to gravitational forces, the projectile will undergo a certain amount of vertical bullet drop relative to the rifle bore line 230 at any point along the ballistic trajectory 220 of the projectile.

Figure 4B:
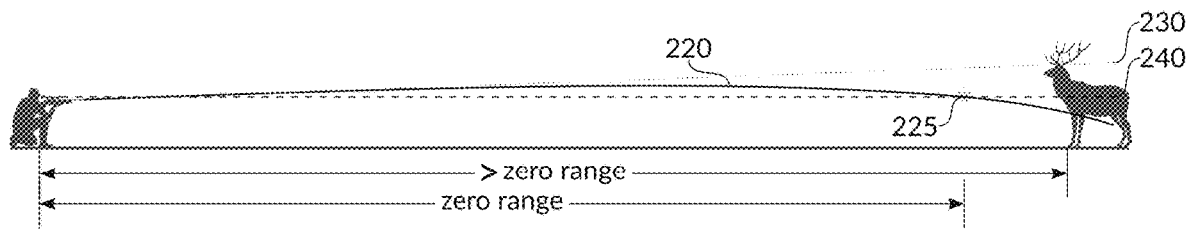
FIG. 4B shows another example ballistic trajectory.
Figure 4C:
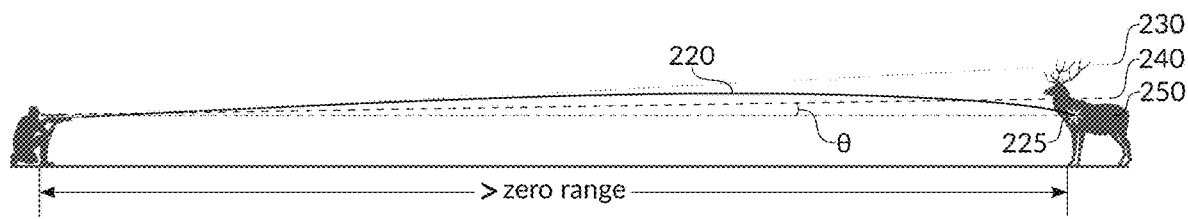
FIG. 4C shows an example ballistic trajectory as well as a calculated deviation from the ballistic trajectory.

At the zero range, the ballistic trajectory 220 and correlated bullet drop have already been calibrated during the zeroing-in process, so that the optical axis 240 intersects the ballistic trajectory 220 at the point of impact 225, as illustrated in FIG. 4A. Thus, a shooter has a high degree of certainty that the shot will hit the target at the desired point. At ranges beyond (or before) the zero range, however, when the shooter aims at the same point on the target through the central aiming point along the optical axis 240 of the riflescope 110, the intersection 225 of the ballistic trajectory 220 and the optical axis 240 will still occur at the zero range, while the actual point of impact will be lower if the bullet hits the target at all, as shown in FIG. 4B. Note that in FIG. 4B the target is further from the shooter than the zero range distance. When the shooter aims at the target, but the target is farther away than the zero range distance, the projectile will miss the target, absent any other correcting factors, such as elevation differential, wind, etc. This could result in a complete miss that scares the target away, or a non-fatal shot that wounds the target and causes it run off injured before the shooter can re-calibrate and administer a kill shot. Therefore, for increased accuracy and to ensure the user is taking ethical shots at long-range targets, the ballistic aiming system automatically calculates a ballistics solution (illustrated here as an angle θ), based on multiple, real-time data inputs, thereby providing increased shooting accuracy. Alternatively, the user may select which inputs are updated manually and/or in real-time within the system as well as which variables to keep constant and/or not use within the ballistic solution calculation. The ballistic aiming system uses the ballistics solution θ to instantly visibly indicate a specifically calibrated holdover point or aiming adjustment points in the digital reticle riflescope's field of view that the user may use to aim at the desired point on the target. As shown in FIG. 4C, the line of sight 250 along the point within the field of view of the digital reticle riflescope 110, indicated by the ballistic aiming system, intersects with the ballistic trajectory 220 at the desired point of impact 225 on the target.

For given environmental conditions, selected projectile, and other user input information, the ballistics solution application 130 may compute a new ballistic trajectory 220 for the selected projectile. The ballistics solution application 130 may use stored drag curves, such as the G1, G7 curves mentioned above, and custom drag curves, empirically measured data tables, the ballistics information described above, and/or algorithms for the selected projectile to calculate the amount of vertical bullet drop at any range.

The ballistics solution application 130 may use the computed ballistic trajectory 220 to calculate a ballistics solution $\theta$ for a given range. The ballistics solution $\theta$ may be given in terms of the amount of angular adjustment that should be made to the rifle 115 to hit the target at the determined range. The ballistics solution $\theta$ may be a set of both an elevation angle $\gamma$ and an azimuth angle $\varphi$, i.e., a horizontal component and a vertical component. The amount of adjustment in the ballistics solution $\theta$ may be given in minutes of angle (MOA), milliradian (mil or MRAD), Bullet Drop Compensation (BDC), etc.

Because zeroing-in the riflescope 110 to the rifle 115 results in the riflescope 110 and its optical axis 240 being set at a constant angle relative to the rifle bore line 230, any angular adjustment $\theta$ to the riflescope 110 will result in the same angular adjustment $\theta$ to the rifle.

The ballistics solution $\theta$ will vary depending on the range to the target. Alternatively, if no range is input, the ballistics solution $\theta$ may be given as a set of angular adjustment values $\theta_{100} \ldots \theta_n$ for a series of incremental ranges. For example, if the zero range was 100 yards, the ballistics solution $\theta$ could include an angular adjustment value $\theta_{100}$ of 0 mil for 100 yards, since the ballistic trajectory 220 should already coincide with the optical axis 240 at the point of impact 225 for the zero range, and another angular adjustment value $\theta_{200}$ of 0.62 mil for 200 yards, etc. In some embodiments, the user may choose how many and which yardage targets will be displayed on the digital reticle riflescope 110. For instance, the user may operate the ballistics solution application 130 to elect to show holdover indicators for 3 distances, 100, 300, and 500 yards. In some embodiments the user may choose up to 8 or 10 different yardages. In operation, in some embodiments, the ballistics solution application 130 calculates different ballistic solutions $\theta$ for each of the selected yardages, and sends them to the digital reticle riflescope as separate solutions, where they are stored on the riflescope 100. The riflescope then calculates or otherwise determines which holdover solutions to select, such as by illuminating particular LEDs, as described in detail below.

In addition to the zero range, the ballistics solution application 130 may store environmental conditions present during zeroing-in. For example, the ballistics solution application 130 may store multiple rifle 115 and projectile profiles, for different ammunition, zero ranges, etc. The ballistics solution application 130 may store user-entered data observed from previous engagements (DOPE) and other information that may be correlated with a particular rifle 115 and projectile profile combination. The ballistics solution application 130 may use some or all of user-entered information and/or data automatically received from peripheral sensors within the ballistic aiming system 300, as shown in FIG. 3, for example.

Rangefinder

The rangefinder 140 may be a laser rangefinder, such as the KILO2400 available from SIG SAUER of Newington, N.H., USA, or other rangefinder. The rangefinder 140 may include a built-in ballistics solution calculator for determining a ballistics solution $\theta$ based on the determined range to the target, the selected projectile, the selected rifle, and the environmental conditions. In other words, as described above and shown in FIG. 2, the rangefinder 140 may be paired directly to the digital reticle riflescope 110, and thus, may operate within the ballistic aiming system 200 without the need for the device 120 running the ballistics solution application 130. Specifically, the rangefinder 140 may determine the range to the target and then calculate a ballistics solution $\theta$ based on the determined range and other data input by the user or received via peripheral sensor devices.

Additionally or alternatively, as shown in FIG. 3, the rangefinder 140 may be paired with both the digital reticle riflescope 110 and the device 120 running the ballistics solution application 130. In this configuration of the ballistic aiming system 300, the rangefinder 140 may send real-time compensation data, from the rangefinder 140 itself or from connected peripherals, to the device 120 running the ballistics solution application 130. In this way, the user may view the real-time data streamed to the ballistics solution application 130 and updated on the screen. Thus, an additional or alternative weapon using a conventional riflescope may also benefit from the device 120 running the ballistics solution application 130, since that weapon's profile may be selected and its ballistics solution $\theta$ displayed for the determined range and environmental conditions. This may be most advantageous for groups of hunters with spotters and multiple weapon and projectile profiles.

Digital Reticle

Figure 5:
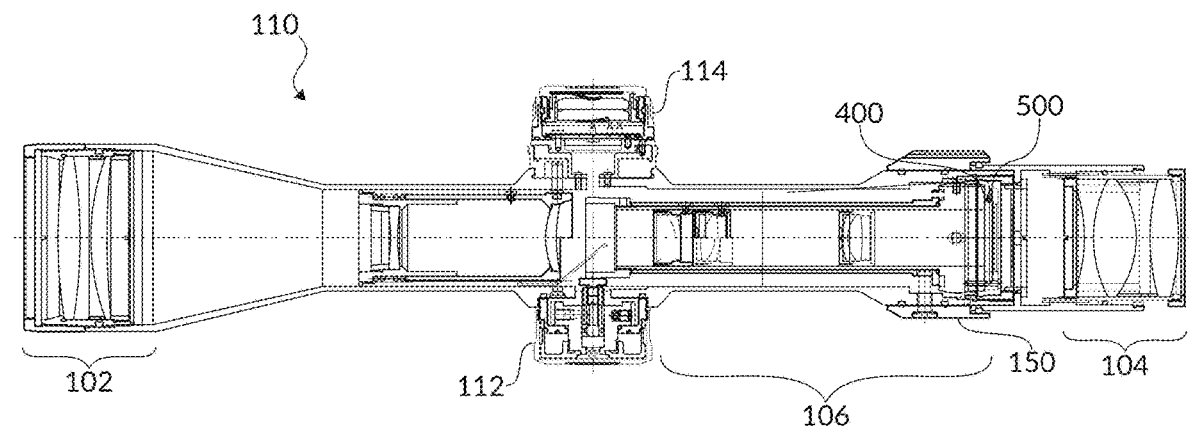
FIG. 5 shows a cross-sectional view of an example digital reticle riflescope according to embodiments of the invention.

As shown in FIG. 5, the digital reticle riflescope 110 may include an objective lens assembly 102, an ocular lens assembly 104, an erector lens assembly 106, elevation and windage adjustment turrets 112 and 114, a mechanical reticle 400, and a digital reticle 500.

Figure 7:
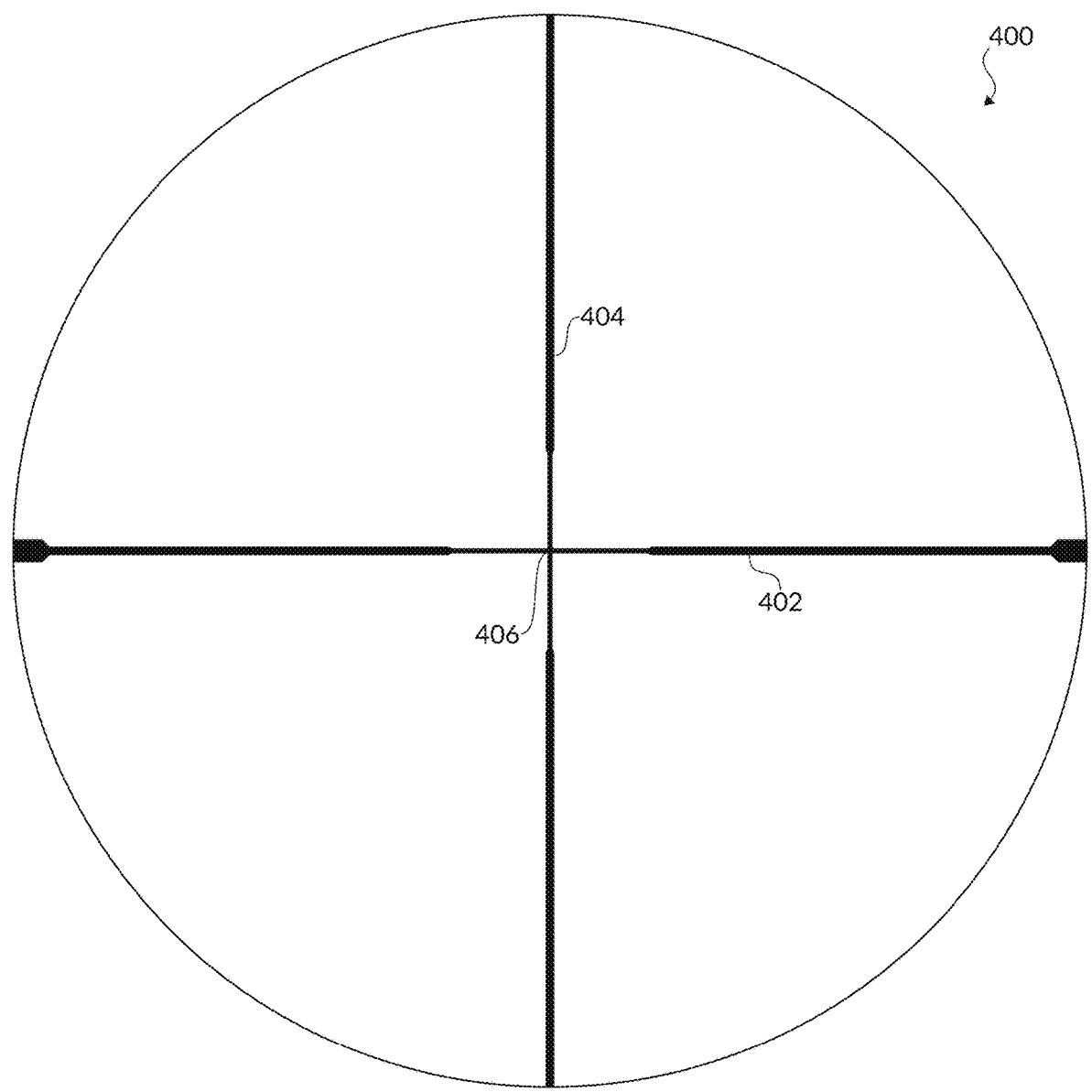
FIG. 7 shows a mechanical reticle within the field of view of an example digital reticle riflescope.

The digital reticle riflescope 110 includes a mechanical reticle 400 within its field of view, such as is shown in FIG. 7. The mechanical reticle 400 may be provided within and/or on a reticle lens, plano-plano glass, and/or electro-formed wire reticle and include a horizontal crosshair 402 and a vertical crosshair 404 that intersect in the center of the field of view along the optical axis 240 of the digital reticle riflescope 110. For example, the horizontal and vertical crosshairs 402 and 404 of the mechanical reticle 400 may have a modified plex design, as shown in FIG. 7, with widths ranging from about 70 μm to about 120 μm. The horizontal and vertical crosshairs 402 and 404 of the mechanical reticle 400 form a central aiming point intersection 406 at the optical axis 240. The shooter may use this central aiming point intersection 406 of the mechanical reticle 400 to zero-in the riflescope 110 relative to the rifle 115 through adjusting the elevation and windage turrets 112 and 114 until the optical axis 240 intersects the ballistic trajectory 220 at the zero range.

Figure 6:
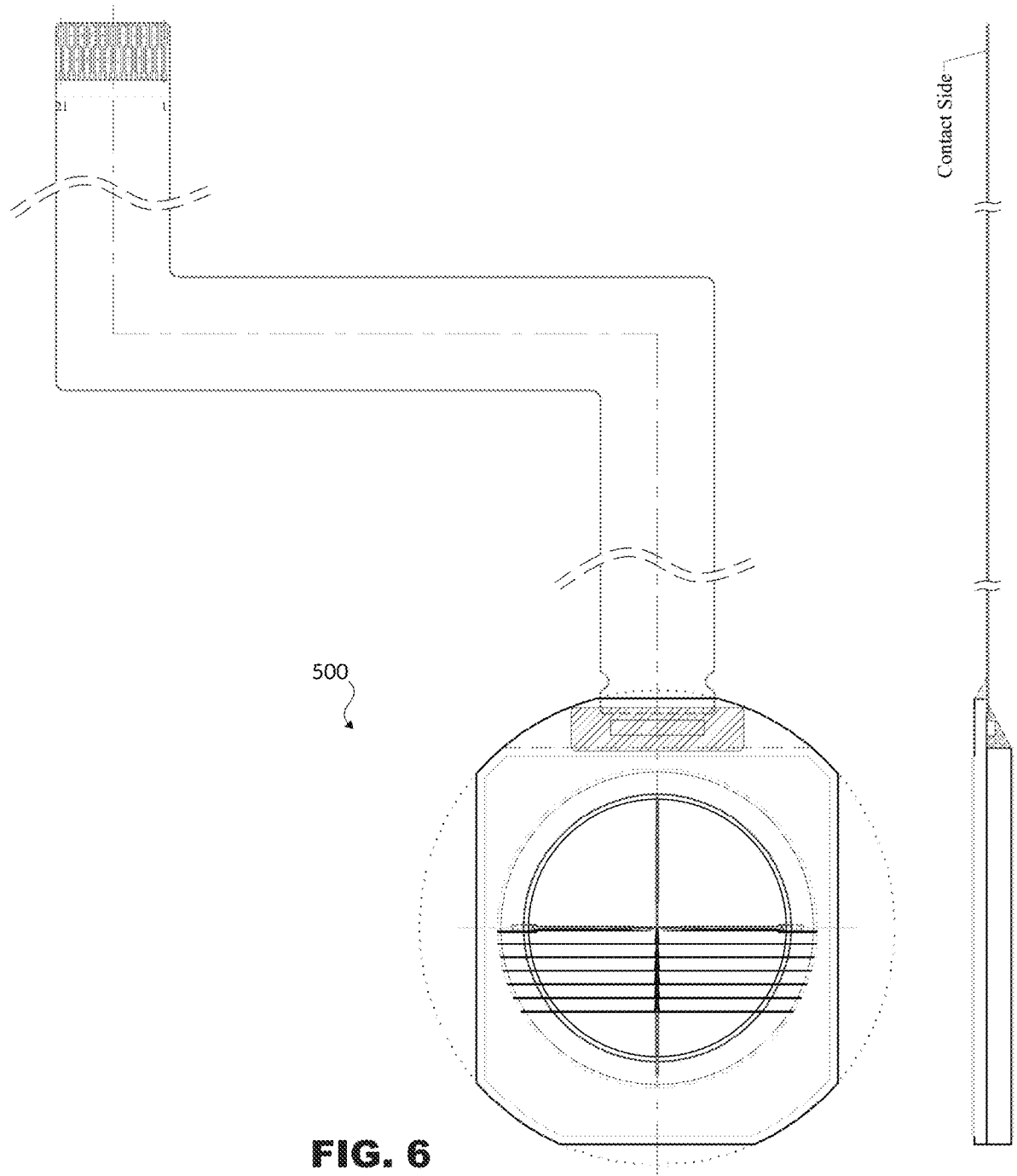
FIG. 6 shows a wiring schematic view of an example digital reticle according to embodiments of the invention.
Figure 8:
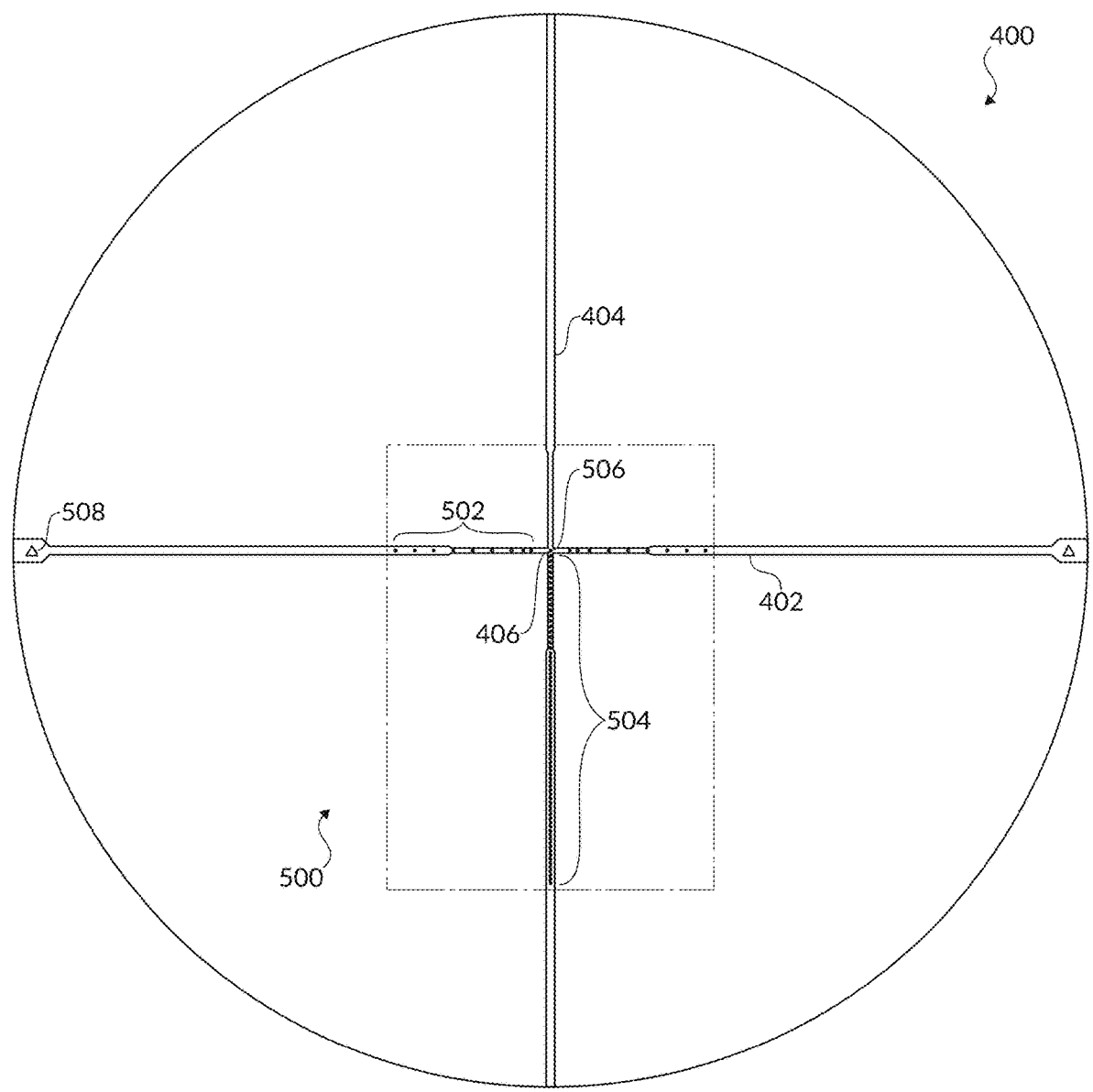
FIG. 8 shows a digital reticle with LEDs overlaid on the mechanical reticle within the field of view of the digital reticle riflescope of FIG. 7 according to embodiments of the invention.

The digital reticle 500 may include a series of holdover indicators, such as individually addressable LEDs, that are selectively lit by a processor within the digital reticle riflescope 110. For example, the digital reticle 500 may include 25-200 individually addressable LEDs located along the horizontal and vertical crosshairs 402 and 404 of the mechanical reticle 400, as illustrated in FIG. 8. In some embodiments the holdover indicators appear only on either the horizontal crosshair 402 or vertical crosshair 404. In other embodiments the holdover indicators appear on both the horizontal and vertical crosshairs 402 and 404, and nowhere else on the digital reticle 500. The LEDs may be arranged within a clear substrate, shaped to cooperate with the mechanical reticle 400 and its containing structure, and connected to power and the processor through leads, as shown in FIG. 6. The leads may be grouped together in sets of 5-10, which may run horizontally, parallel with the horizontal crosshair 402, from the edge of the field of view to the corresponding groups of LEDs, connecting them for selective illumination by the digital reticle riflescope 110. For example, 72 LEDs may be grouped into 12 sets of 6, where each set has a grouping of 6 connector leads, each about 7 µm thick with about 10 µm spacing between, that run from the vertical crosshair 404 either to the left or to the right, so that the connector lead groupings form only 6 lines, each about 0.078 mm thick with about 0.7 mm spacing between, crossing the entire field of view, as shown in FIG. 6. These leads are not readily visible, but rather may have some level of transparency within the field of view of the digital reticle riflescope 110, although the LEDs themselves would be visible, were they not blocked by the wider horizontal and vertical crosshairs 402 and 404 of the mechanical reticle 400 behind them. Additionally or alternatively, the connector leads may run vertically, parallel to the vertical crosshair 404, although this may appear blurrier than the horizontally oriented leads.

The LEDs may be non-transmissive OLEDs arranged atop the mechanical horizontal and vertical crosshairs 402 and 404. The OLEDs may be around 40 µm, for example, with about a 30 µm dot size. The dot pitch for the OLEDs may be 0.056 mm, for example, and may vary depending on the location along the horizontal and vertical crosshairs 402 and 404 of the mechanical reticle 400. The OLEDs may have a very thin cathode deposition layer with a transparency of under 5%, for example. Additionally or alternatively, the LEDs may be TOLEDs with 60% transmission. Advantageously, however, the LEDs need not be transparent nor transmissive due to their arrangement atop the horizontal and vertical crosshairs 402 and 404 of the mechanical reticle 400. This allows for cost savings and less expensive manufacture of the digital reticle 500. Embodiments of the invention may work with any appropriate indicator or lighting technology, and is not limited to any particular technology.

The LEDs may be arranged on or adjacent the containing structure of the mechanical reticle 400, which may be located in the first and/or second focal plane, for example, near the objective and/or ocular lens of the riflescope 110. To enable the user to view the LEDs when lit, the LEDs may be located on the side of the mechanical reticle 400 closer to the ocular lens and oriented to illuminate in the direction of the ocular lens along the optical axis, as shown in FIG. 5. If the mechanical reticle 400 is located in the first focal plane, the riflescope 110 may light LEDs corresponding to a ballistic solution θ and those same LEDs may remain lit throughout all magnification powers of the riflescope 110. Additionally or alternatively, the mechanical reticle 400 may be located in a different focal plane than some or all of the LEDs.

Figure 9:
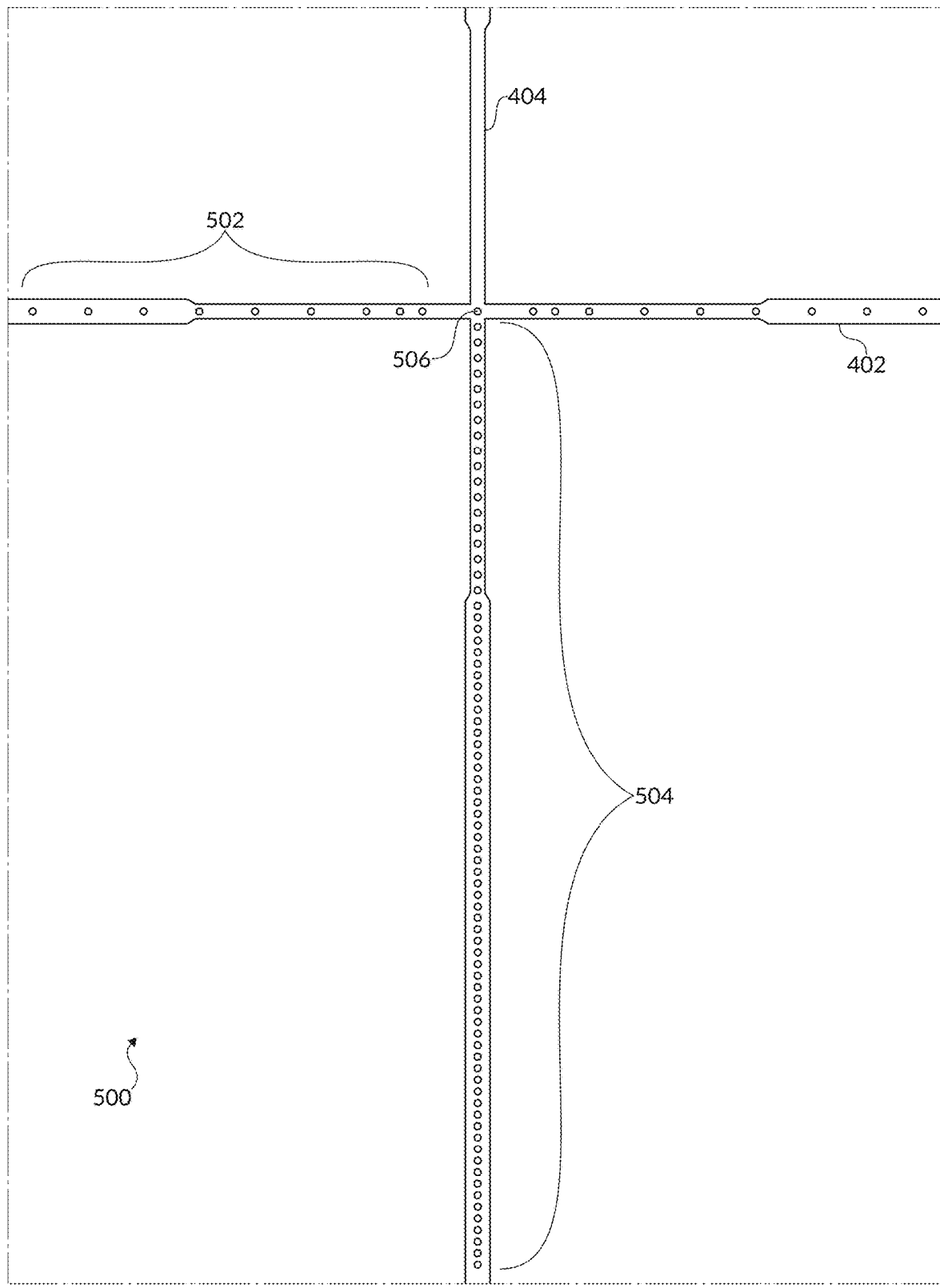
FIG. 9 is a detailed portion of the field of view of the digital reticle riflescope of FIG. 8, including the mechanical reticle with crosshairs and the digital reticle with LEDs according to embodiments of the invention.

FIG. 8 shows the digital reticle 500 atop the mechanical reticle 400 in the field of view of the digital reticle riflescope 110. The digital reticle 500 includes a central LED 506 that is co-located with the central aiming point intersection 406 of the mechanical reticle 400 and the optical axis 240 of the digital reticle riflescope 110. Vertical or elevation adjustment LEDs 504 of the digital reticle 500 are located along the vertical crosshair 404 of the mechanical reticle 400 and may be lit to provide the corresponding vertical aiming adjustment of the ballistics solution θ to compensate for bullet drop. Horizontal or windage adjustment LEDs 502 of the digital reticle 500 are located along the horizontal crosshair 402 of the mechanical reticle 400 and may be lit to provide the corresponding horizontal aiming adjustment of the ballistics solution θ to compensate for crosswind, as described below. The digital reticle 500 may also include anti-cant indicators 508 along the side edges of the horizontal crosshair 402 that alert the user to rotate the rifle 115, independently of the ballistics solution θ. Such cant systems are described in U.S. patent application Ser. No. 15/220,254, entitled Optical System with Cant Indication and U.S. patent application Ser. No. 15/372,877, entitled Optical System Accessory with Cant Indication, both of which are incorporated by reference herein. FIG. 9 shows a more detailed view of the digital reticle 500 atop the mechanical reticle 400 in the central portion of the digital reticle riflescope's field of view from FIG. 8.

In operation of the digital reticle, the holdover indicator LEDs are lit to provide aiming adjustment points for the user. The particular holdover indicators that are energized may be selected by a processor 112 located on or in communication with the digital reticle riflescope 110 (FIG. 3). An aiming adjustment point indicates to the user how far along the horizontal and vertical directions to shift the central aiming point to superimpose or align over the desired point of impact on the target. The aiming adjustment points may be located along both the horizontal and vertical crosshairs.

The digital reticle riflescope 110 may receive a ballistics solution θ from the rangefinder 140 or the device 120 running the ballistics solution application 130. The ballistics solution θ may include an aiming adjustment in the form of MOA, mil, etc. for adjusting the holdover point vertically, to compensate for gravitational bullet drop, for example. The ballistics solution θ may also include an aiming adjustment in the form of MOA, mil, etc. for adjusting the holdover point horizontally, such as for wind correction. The processor 112 determines which holdover indicators are selected based at least in part on the ballistics solution θ. In other words, different ballistics solutions θ may cause the processor 112 to select different holdover indicators. The processor 112 may calculate and select which holdover indicator to energize based on the received ballistics solution. The processor 112 may determine that a particular solution falls between two discrete holdover indicators and perform a rounding function to select the closest one. As described below, the processor 112 may take into account a magnification setting of the digital reticle riflescope 110. The processor 112 may then cause the selected holdover indicator to changes state, such as by causing electric current to flow through one or more of the selected LEDs. Aiming with the proper holdover indicator allows the shooter to properly aim at a target without making adjustments to the windage or elevation turrets, saving time and increasing efficiency and accuracy.

Figure 11:
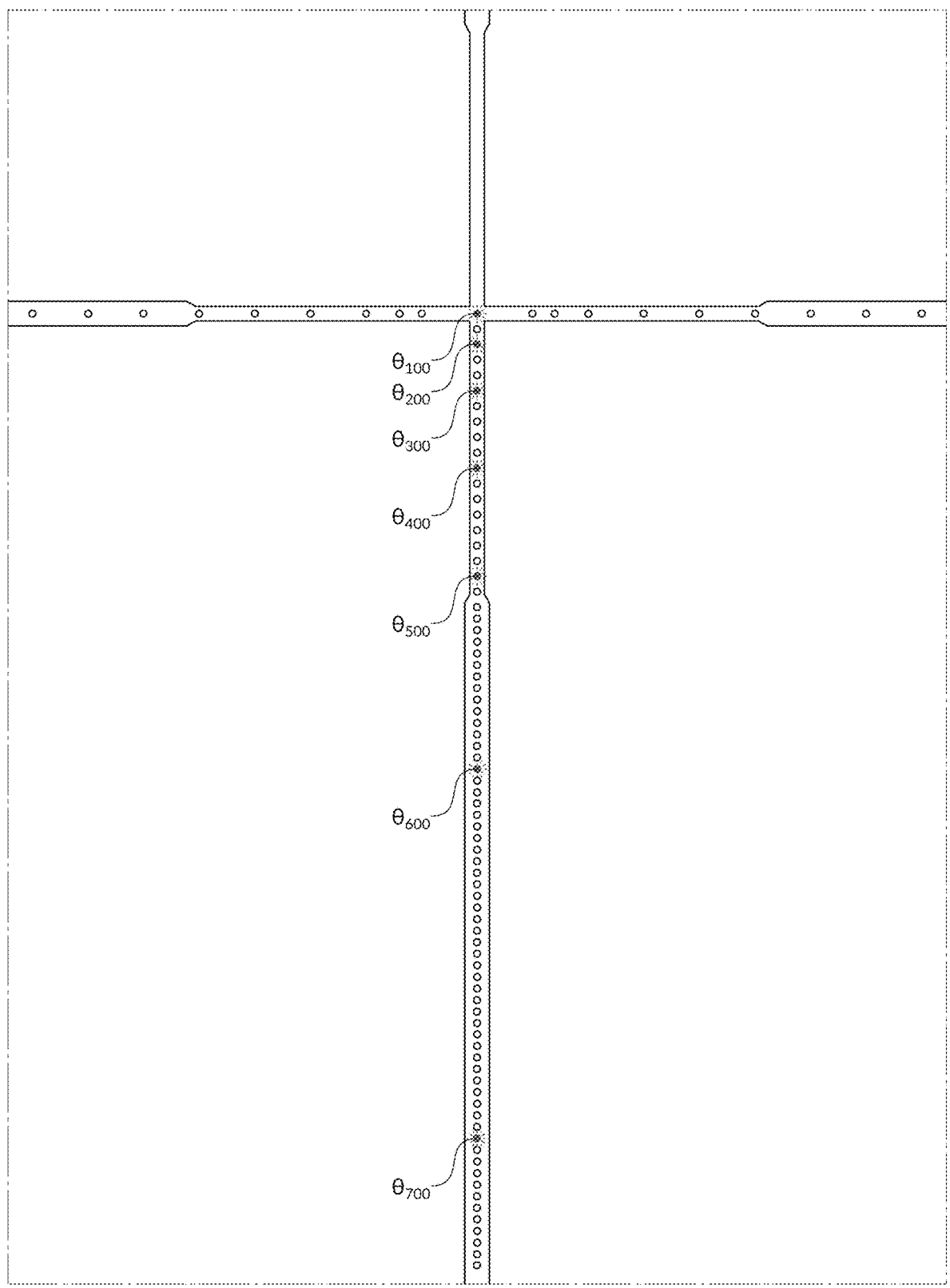
FIG. 11 is the detailed portion of the field of view of the digital reticle riflescope of FIG. 9, displaying a ballistics solution for a set of ranges through selectively lit LEDs according to embodiments of the invention.

As shown in FIG. 11, the digital reticle riflescope 110 has lit a series of LEDs $\theta_{100}$ . . . $\theta_{700}$ corresponding to the ballistics solution θ for a set of incremental ranges when no range to the target has been determined, such as in the ballistic aiming system 100 of FIG. 1 that does not include a rangefinder 140. The user may separately determine the range to target and use the lit LEDs corresponding to incremental ranges to adjust his aim. For example, the shooter may manually estimate the range as 300 yards. The shooter would then use the third illuminated aim point down as the holdover point, since it corresponds with the pre-calculated ballistic solution θ for the rifle and projectile set at 300 yards. As described above, the number of simultaneously lit holdover indicators may be user controlled. In FIG. 11, the user has selected, or the system defaulted, to energizing seven separate holdover indicators.

Figure 12:
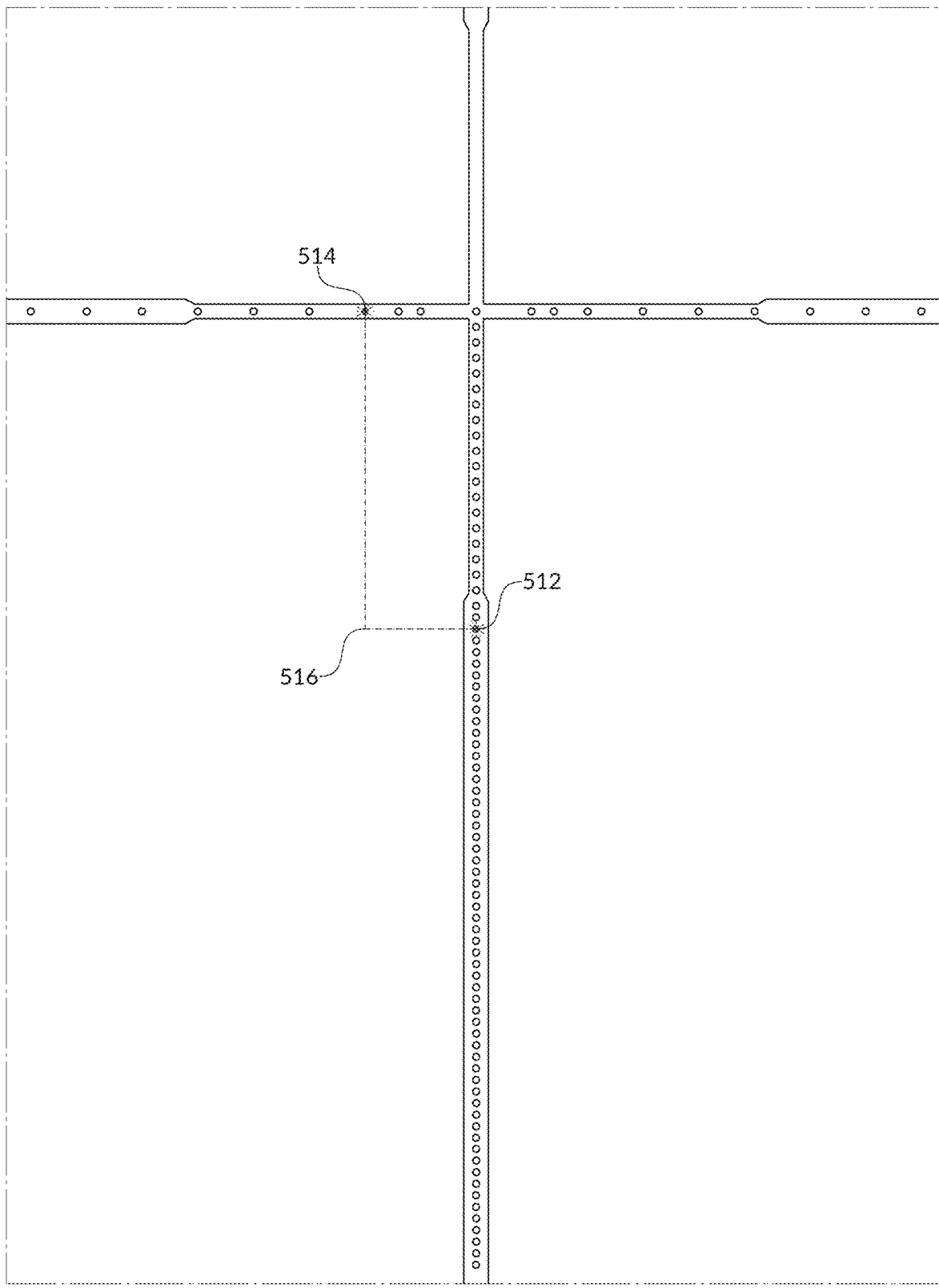
FIG. 12 is the detailed portion of the field of view of the digital reticle riflescope of FIG. 9, displaying a ballistics solution through selectively lit LEDs that act as aiming adjustment points according to embodiments of the invention.

As shown in FIG. 12, the digital reticle riflescope 110 has lit an LED along the vertical crosshair 404 to indicate a vertical aiming adjustment point 512. Additionally in FIG. 12, the digital reticle riflescope 110 has lit an LED along the horizontal crosshair 402 to indicate a horizontal aiming adjustment point 514. The vertical and horizontal aiming adjustment points 512 and 514 may be used by the shooter to quickly find the corresponding virtual holdover point 516 in the field of view of the digital reticle riflescope 110 that represents the best ballistics solution θ based on the input data. For example, the shooter may hold the central crosshair intersection over the target, take note of where the windage point 514 falls with respect to the target, then place the elevation point 512 over the place where the windage point 514 fell with respect to the target, and fire.

The digital reticle riflescope 110 may selectively illuminate LEDs atop the mechanical reticle 400 based on the ballistics solution θ received and the magnification level of the digital reticle riflescope 110.

Figure 10:
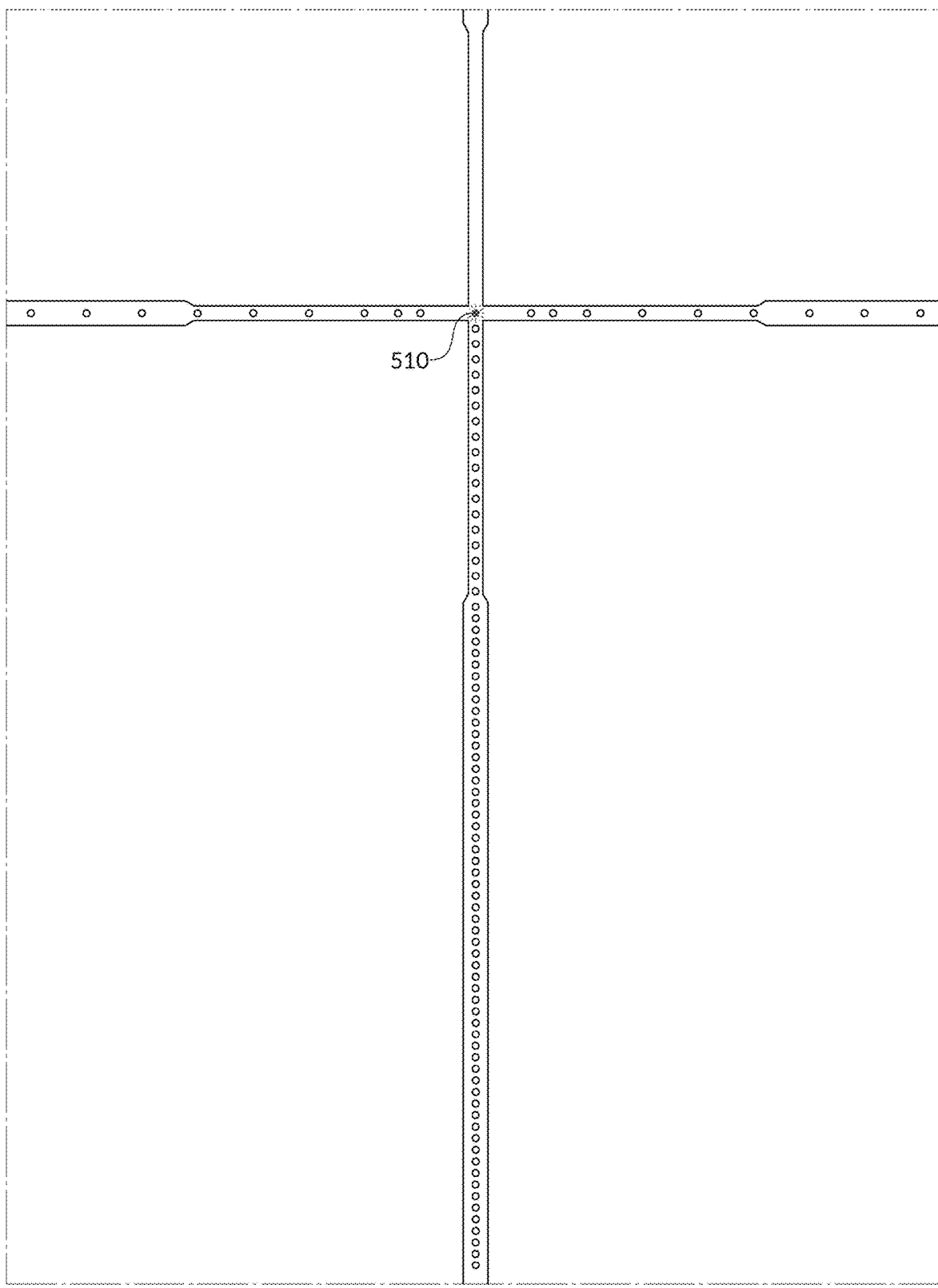
FIG. 10 is the detailed portion of the field of view of the digital reticle riflescope of FIG. 9 with a central LED lit according to embodiments of the invention.
Figure 14:
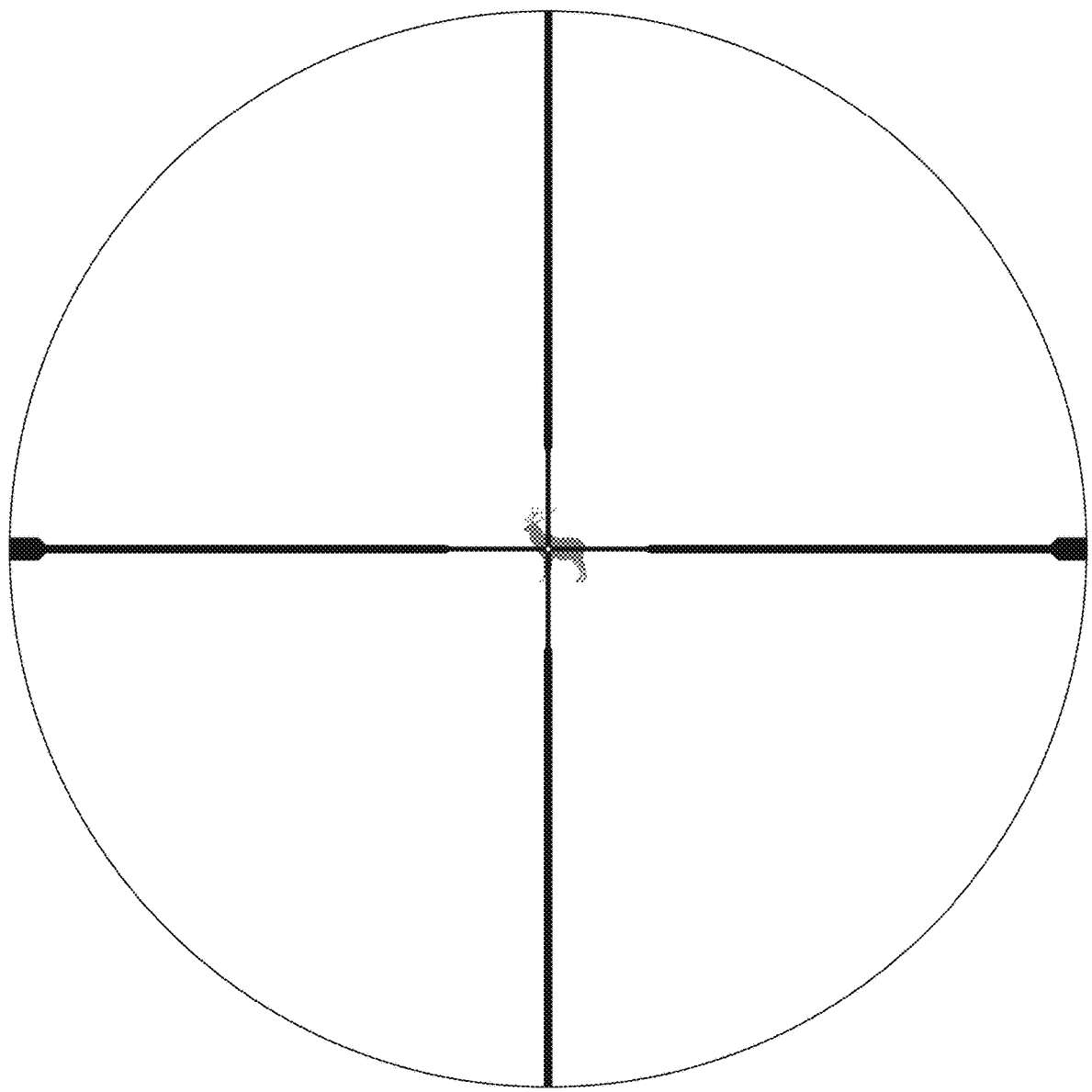
FIG. 14 shows the field of view of an example digital reticle riflescope, displaying a ballistic solution through the lit central LED at a low magnification power level according to embodiments of the invention.

As shown in FIG. 10, when first powered on or when no ballistics solution θ has been sent to the digital reticle riflescope 110, a central lit LED 510, located at the optical axis 240, may help illuminate the central aiming point 406 in low light conditions. Additionally, if the ballistics solution θ does not include a significant horizontal or vertical aiming adjustment at the particular magnification level of the digital reticle riflescope 110, as shown in FIG. 14, the central lit LED 510 may indicate the best holdover aiming point for the ballistics solution θ.

The digital reticle 500 provides an advantage over Bullet Drop Compensator (BDC) reticles in that because the holdover points used in embodiments of the invention are dynamic, the user is not limited to only a few projectile types of similar caliber and bullet weight that match the subtension of the predefined holdover reticle markings. Rather, the digital reticle 500 may provide aiming adjustment points for any projectile types because the ballistic aiming system adapts which LEDs are illuminated based on the particular projectile profile selected or programmed. Additionally, the user need not make a custom reference chart for his rifle 115 and projectile profile, as is done with BDC reticles, because the digital reticle riflescope 110 will illuminate the exact aiming adjustment points to use for the selected profile. This feature of the digital reticle riflescope 110 enables it to be used across a variety of firearms, rather than the user having multiple riflescopes with differing BDC reticles matched to each firearm.

Magnification

In some embodiments, the digital reticle riflescope 110 may be a variable power riflescope with a second or rear focal plane reticle. The digital reticle riflescope 110 may further selectively illuminate LEDs based at least in part on the magnification power level of the riflescope 110. The magnification power level may be determined using an encoder, sensors, mechanical position indicators, etc. As the user increases or decreases the magnification power. In this way, even if the digital reticle 500 is in the second focal plane, it may dynamically display the ballistic solution θ as a function of the magnified target view over the mechanical reticle 400 that remains the same size throughout the magnification levels. In operation, the digital reticle riflescope 110 operates as described above, by receiving a ballistics solution θ and then calculating which holdover indicator should be illuminated. In embodiments of the invention that include magnification compensation, the processor 112 takes the present magnification setting into account when calculating which holdover indicator to illuminate. As described above, the magnification power level may be determined using an encoder or sensor, etc., and the determined power level is then communicated to the processor 112.

Figure 15:
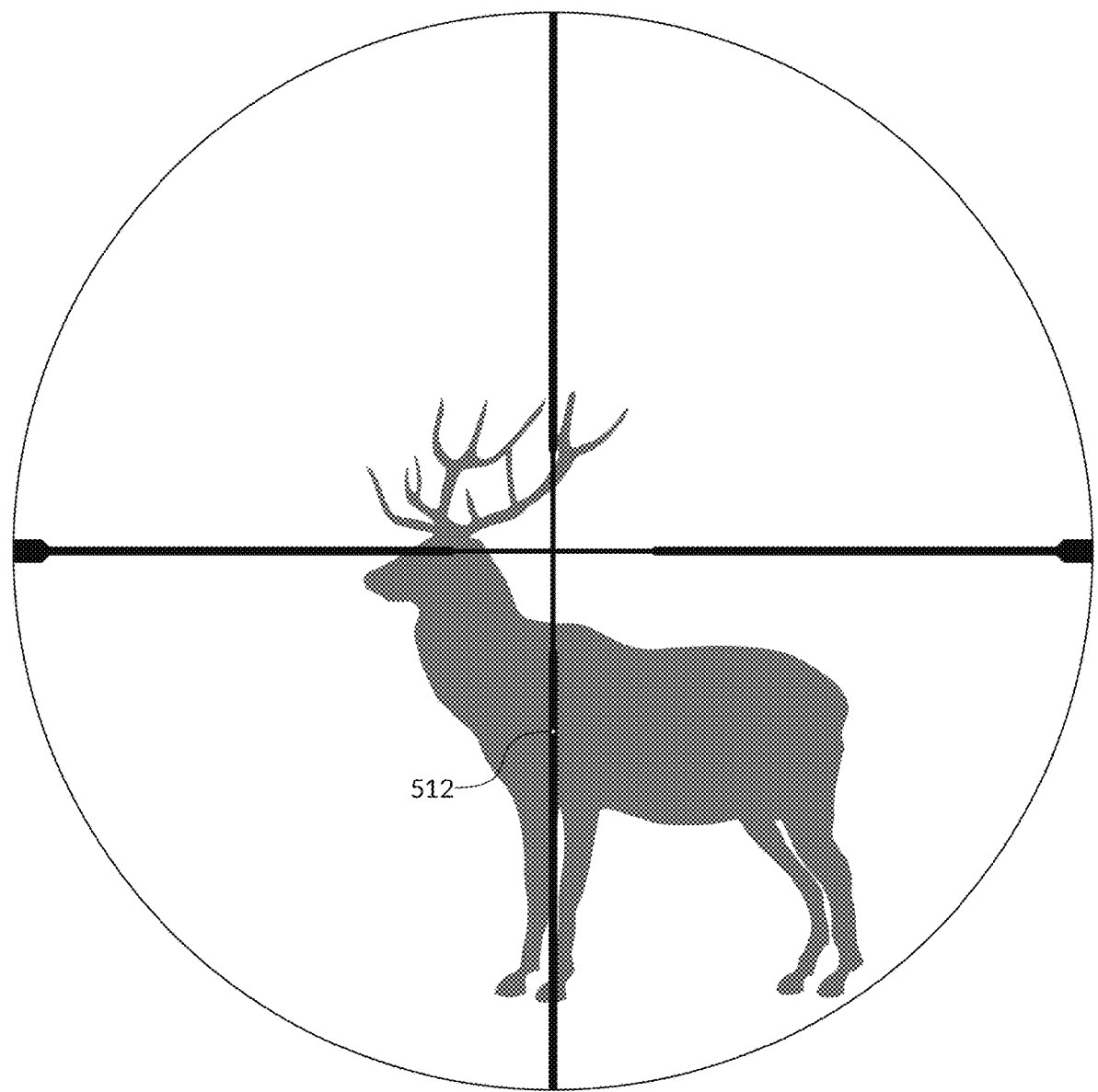
FIG. 15 shows the field of view of the digital reticle riflescope of FIG. 14, displaying the ballistic solution through the lit LED, acting as an aiming point, at a higher magnification power level according to embodiments of the invention.
Figure 16:
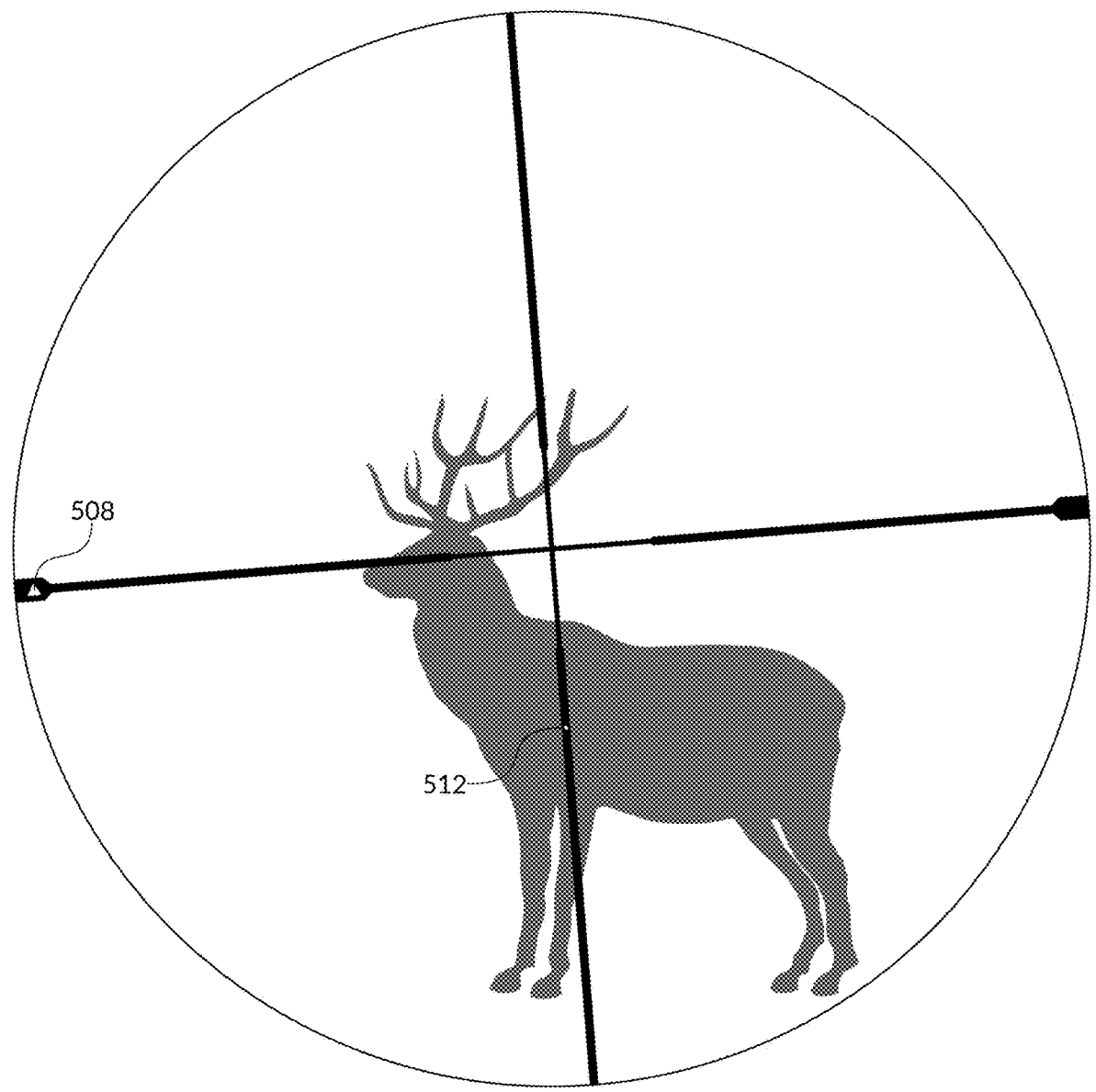
FIG. 16 shows the field of view of the digital reticle riflescope of FIG. 14, at the higher magnification power level of FIG. 15, displaying both the ballistic solution and an anti-cant indicator according to embodiments of the invention.

As shown in FIG. 14, the lit central LED 510 in the field of view of the digital reticle riflescope 110 indicates the best holdover aiming point for the ballistics solution θ at the lower magnification power level. When the user zooms in, however, as shown in FIG. 15, the lit LED indicates the vertical aiming adjustment point 512 as the best holdover aiming point for the same ballistics solution θ, but at a higher magnification power level. In this way, the digital reticle riflescope 110 advantageously allows the user to make finer adjustments to his rifle 115 according to the ballistics solution θ, using dynamic holdover aiming points for the same ballistics solution θ line of sight 250 at increasing magnification power levels. Additionally, FIG. 16 shows the same vertical aiming adjustment point 512 at the same magnification power level of FIG. 15, but with the LevelPlex system of the digital reticle riflescope 110 switched on to provide feedback to the user about rifle cant, independently of the ballistics solution θ.

Power Selector Ring

Figure 13:
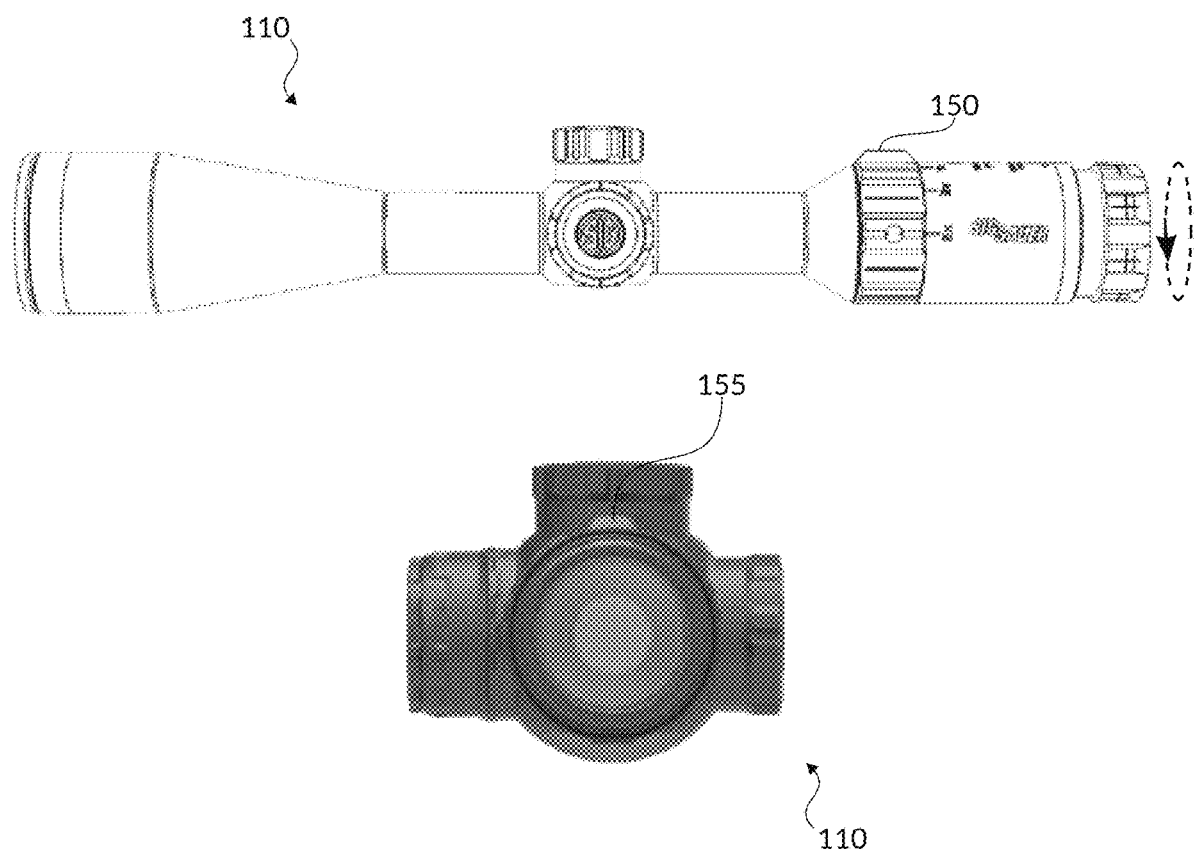
FIG. 13 shows an example digital reticle riflescope with a power selector ring and an LED indicator according to embodiments of the invention.

As shown in FIG. 13, the digital reticle riflescope 110 may include a power selector ring 150 for altering the magnification power level of the riflescope 110. The greater the magnification power level, the larger the image of the target within the field of view will appear.

The power selector ring 150 may include an encoder, a zoom sensor, or other method of determining the selected magnification power level for the riflescope 110 at any given time. The encoder may send a magnification signal to a processor within the riflescope 110. The magnification signal may include data about the selected and/or last magnification power level of the riflescope 110 and/or power selector ring 150. Based on the magnification signal, the processor may determine which LEDs to selectively illuminate on the digital reticle 500 to compensate for the new and/or changed magnification power level.

Figure 17:
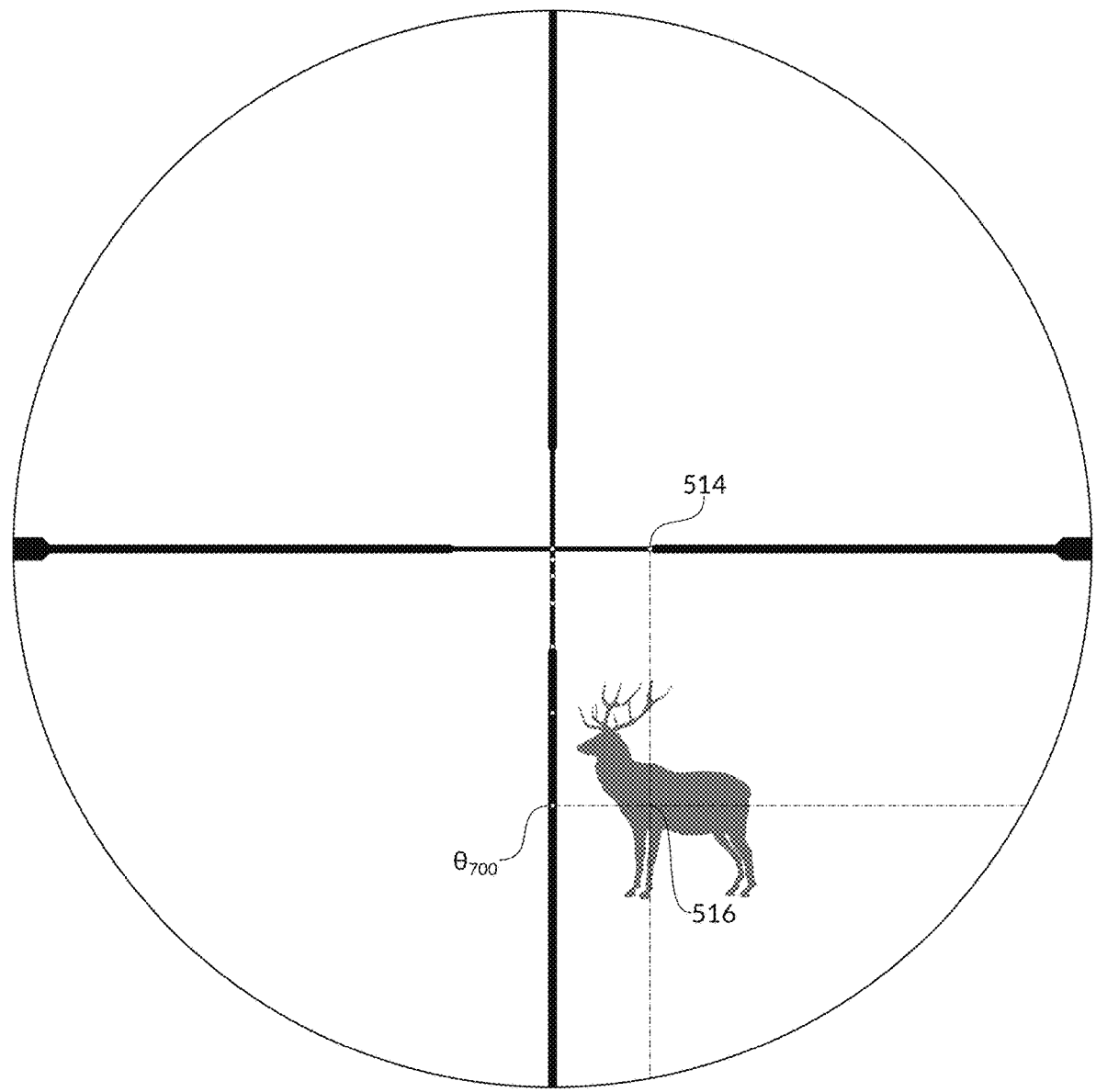
FIG. 17 shows the field of view of an example digital reticle riflescope, displaying a ballistic solution for a set of ranges through the lit LEDs, acting as aiming adjustment points, at a low magnification power level according to embodiments of the invention.
Figure 18:
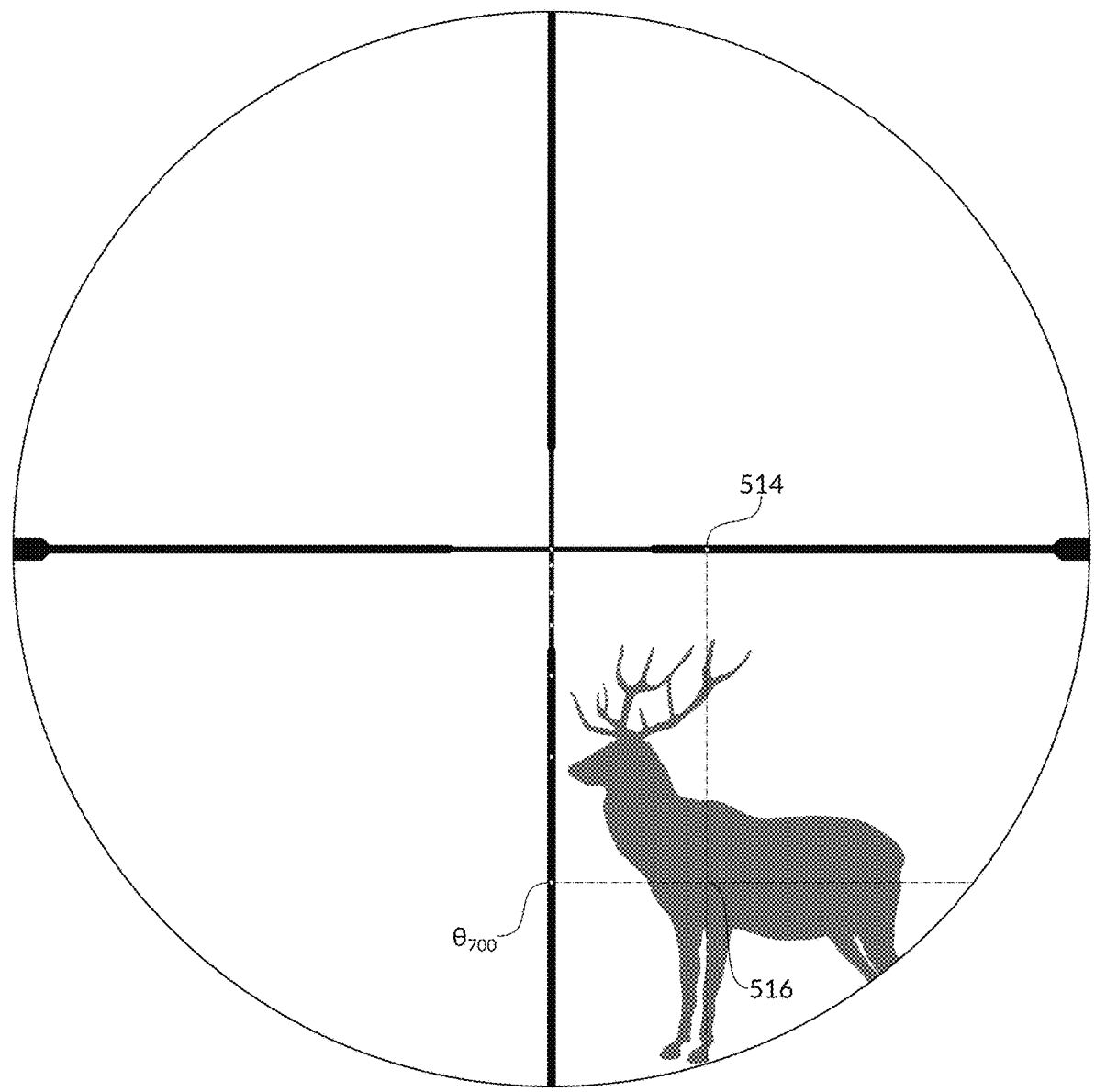
FIG. 18 shows the field of view of the digital reticle riflescope of FIG. 17, displaying the ballistic solution for a set of ranges through the different lit LEDs at a higher magnification power level according to embodiments of the invention.

For example, as shown in FIG. 17, the digital reticle riflescope 110 has lit LEDs indicating a horizontal aiming adjustment point 514 on the horizontal crosshair 402 and a series of vertical aiming adjustment points, including $\theta_{700}$, on the vertical crosshair 404, corresponding to both the lower magnification power level and the ballistics solution θ for a set of ranges and determined crosswind. When the user turns the power selector ring 150 to increase the magnification power level, as shown in FIG. 18, the digital reticle riflescope 110 changes which LEDs are lit for the same ballistics solution θ in response. As shown in FIG. 18, the horizontal aiming adjustment point 514 is located further to the right along the horizontal crosshair 402 and the vertical aiming adjustment point $\theta_{700}$ is located further down on the vertical crosshair 404. Even though the holdover aiming point 516 of FIG. 18 has shifted down and to the right from the holdover aiming point 516 of FIG. 17, the corresponding line of sight 250 through the holdover aiming point 516 has not changed, since the ballistics solution θ (i.e., the relative rifle 115 orientation) is the same.

The power selector ring 150 may include an LED or other indicator 155 that is oriented to illuminate in the direction of the user, as shown in FIG. 13. The LED indicator 155 may illuminate when the digital reticle riflescope 110 is wirelessly paired with the rangefinder 140 and/or device 120 running the ballistics solution application 130 over Bluetooth or other communications means. Additionally, the LED indicator 155 may flash for various counts, set times, and/or frequencies to indicate different states to the user. Additionally or alternatively, the LED indicator 155 may change colors to indicate different states to the user. For example, the LED indicator 155 may flash at a slower frequency when the user is configuring the digital reticle riflescope 110 through the ballistics solution application 130 running on a paired device 120. As another non-limiting example, the LED indicator 155 may flash five times at a more rapid frequency and then remain constantly on for five seconds to indicate to the user that a target is being ranged using a paired rangefinder 140 and a new ballistics solution $\theta$ has been received by the digital reticle riflescope 110. The LED indicator 155 may have its brightness, color, and/or power controlled or set by the user through controls on the digital reticle riflescope 110 and/or configuration settings within the ballistics solution application 130. Additionally or alternatively, the LED indicator 155 may be located elsewhere on the digital reticle riflescope 110, such as on the diopter adjustment ring or within the field of view through the ocular lens, for example. In this way, the LED indicator 155 advantageously signals to the user that the digital reticle riflescope 110 is ready to be used with the latest ballistics solution $\theta$ without the user having to move out of shooting posture.

All described embodiments and features of the disclosed invention may be combined with each other in any arbitrary manner, except where as described to be exclusive or known to those of skill in the art as technically unable to be combined. The above description is meant to be read broadly, and in a non-limiting manner, and the invention is limited only by the scope of the claims below.

What is claimed is:

1. A method for operating an electro-mechanical reticle for an aiming device, the reticle including a primary crosshair formed of a mechanical reticle that is visible when the reticle is both powered off and powered on, and the reticle including a plurality of electrically powered holdover indicators that may be individually selected, the plurality of holdover indicators shaped and positioned to be fully contained within the mechanical reticle, the method comprising:
   receiving ballistics data from a ballistics computing device;
   selecting one or more of the plurality of holdover indicators based at least in part on the ballistics data; and
   causing the selected holdover indicator or indicators to visibly change state on the reticle.

2. The method for operating a reticle for an aiming device according to claim 1, further comprising:
   receiving range data from a rangefinder; and
   selecting the one or more of the holdover indicators based at least in part on either or both of the ballistics data and the range data.

3. The method for operating a reticle for an aiming device according to claim 1, further comprising:
   receiving additional data from one or more of the group consisting of: a wind sensor, an inclinometer, a Global Positioning System, a thermometer, an altimeter, a barometer, and a motion sensor, and
   selecting the one or more of the holdover indicators based at least in part on either or both of the ballistics data and the additional data.

4. The method for operating a reticle for an aiming device according to claim 1, further comprising providing an indication of a degree of rotation of the reticle.

5. The method for operating a reticle for an aiming device according to claim 1, in which causing the selected holdover indicator or indicators to visibly change state on the reticle comprises illuminating at least one LED.

6. The method for operating a reticle for an aiming device according to claim 1, further comprising:
   receiving additional data from a wind sensor and
   selecting one or more of the holdover indicators on a vertical axis of the reticle based at least in part on the ballistics data; and
   selecting another of the plurality of holdover indicators on a horizontal axis of the reticle based at least in part on the additional data.

7. The method for operating a reticle for an aiming device according to claim 6, further comprising causing the one or more selected holdover indicator on the vertical axis of the reticle to visibly change state, and further comprising the selected holdover indicator on the horizontal axis of the reticle to visibly change state.

8. The method for operating a reticle for an aiming device according to claim 1, further comprising receiving magnification data of a riflescope supporting the reticle, and in which selecting one or more of the plurality of holdover indicators based at least in part on the ballistics data comprises selecting one or more of the plurality of holdover indicators based at least in part of the ballistics data and at least in part on the magnification data.

9. The method for operating a reticle for an aiming device according to claim 1, in which receiving ballistics data from a ballistics computing device comprises receiving ballistics data through a wireless communication channel.

10. A method for operating an electronic reticle for an aiming device, the reticle including a vertical primary crosshair having a plurality of electrically powered holdover indicators that may be individually selected, the plurality of holdover indicators shaped and positioned to be fully contained within the vertical primary crosshair, and nowhere else within the field of view of the reticle, the method comprising:
   receiving ballistics data from a ballistics computing device;
   selecting one or more of the plurality of holdover indicators based at least in part on the ballistics data; and
   causing the selected holdover indicator or indicators to visibly change state on the reticle.

11. The method for operating a reticle for an aiming device according to claim 10, further comprising:
   receiving range data from a rangefinder; and
   selecting the one or more of the holdover indicators based at least in part on either or both of the ballistics data and the range data.

12. The method for operating a reticle for an aiming device according to claim 10, further comprising:
   receiving additional data from one or more of the group consisting of: a wind sensor, an inclinometer, a Global Positioning System, a thermometer, an altimeter, a barometer, and a motion sensor, and
   selecting the one or more of the holdover indicators based at least in part on either or both of the ballistics data and the additional data.

13. The method for operating a reticle for an aiming device according to claim 10, further comprising providing an indication of a degree of rotation of the reticle.

14. The method for operating a reticle for an aiming device according to claim 10, in which causing the selected holdover indicator or indicators to visibly change state on the reticle comprises illuminating at least one LED.

15. The method for operating a reticle for an aiming device according to claim 10, in which the reticle further includes a horizontal primary crosshair having a plurality of electrically powered holdover indicators that may be individually selected, the method further comprising:
- receiving additional data from a wind sensor and
- selecting one or more of the holdover indicators on the vertical primary crosshair of the reticle based at least in part on the ballistics data; and
- selecting another of the plurality of holdover indicators on the horizontal primary crosshair of the reticle based at least in part on the additional data.

16. The method for operating a reticle for an aiming device according to claim 15, further comprising causing the one or more selected holdover indicator on the vertical primary crosshair of the reticle to visibly change state, and further comprising the selected holdover indicator on the horizontal primary crosshair of the reticle to visibly change state.

17. The method for operating a reticle for an aiming device according to claim 10, further comprising receiving magnification data of a riflescope supporting the reticle, and in which selecting one or more of the plurality of holdover indicators based at least in part on the ballistics data comprises selecting one or more of the plurality of holdover indicators based at least in part of the ballistics data and at least in part on the magnification data.

18. The method for operating a reticle for an aiming device according to claim 10, in which receiving ballistics data from a ballistics computing device comprises receiving ballistics data through a wireless communication channel.

* * * * *